(12) United States Patent
Thornton

(10) Patent No.: US 10,279,508 B1
(45) Date of Patent: May 7, 2019

(54) HEAVY EQUIPMENT CONCRETE CORE DRILL ATTACHMENT

(71) Applicant: Lee C. Thornton, Huntsville, AL (US)

(72) Inventor: Lee C. Thornton, Huntsville, AL (US)

(*) Notice: Subject to any disclaimer, the term of this patent is extended or adjusted under 35 U.S.C. 154(b) by 0 days.

(21) Appl. No.: 15/990,756

(22) Filed: May 28, 2018

(51) Int. Cl.
| | |
|---|---|
| *B28D 1/00* | (2006.01) |
| *B28D 1/04* | (2006.01) |
| *B23B 51/04* | (2006.01) |
| *E21B 10/48* | (2006.01) |

(52) U.S. Cl.
CPC ............ *B28D 1/041* (2013.01); *B23B 51/044* (2013.01); *B23B 51/0426* (2013.01); *E21B 10/48* (2013.01)

(58) Field of Classification Search
CPC ...... B25H 1/0064; B28D 1/041; B28D 7/005; E21B 7/027; E21B 10/48; E21B 7/024; E21B 7/028; E21B 25/00; B27B 5/10; E01C 23/0933; B23B 51/0406; B23B 51/044
USPC ........................ 299/39.3, 39.4, 41.1; 175/203
See application file for complete search history.

(56) References Cited

U.S. PATENT DOCUMENTS

| | | | | |
|---|---|---|---|---|
| 3,848,687 A | | 11/1974 | Funakubo | |
| 4,763,735 A | * | 8/1988 | Gay | E01C 23/094 172/21 |
| 5,058,688 A | * | 10/1991 | Scott | E21B 7/24 175/122 |
| 5,687,205 A | * | 11/1997 | Matsumoto | G21C 5/10 219/69.17 |
| 6,907,874 B1 | | 6/2005 | Faircloth | |
| 2008/0017182 A1 | | 1/2008 | Hilsgen | |
| 2017/0198524 A1 | * | 7/2017 | Patterson | E21B 7/027 |

* cited by examiner

*Primary Examiner* — Carib A Oquendo
(74) *Attorney, Agent, or Firm* — Cynthia R. Wright

(57) ABSTRACT

The present invention is an attachment that reversibly connects to a skid steer, front loader, or other heavy equipment. The attachment allows a user to quickly and efficiently core holes in concrete and asphalt. The attachment comprises a frame assembly that rests upon the surface of concrete being cored and a carriage assembly. The carriage assembly connects a drum saw to the frame assembly. The carriage assembly moves vertically up and down along the length of the frame assembly while coring a hole in concrete. The attachment includes two, three, and four-post embodiments. The three and four-post embodiments provide include a larger frame assembly that provides additional stability to the attachment while allowing the user to quickly reposition the attachment to core additional holes.

20 Claims, 38 Drawing Sheets

HEAVY EQUIPMENT CONCRETE CORE DRILL ATTACHMENT

CROSS-REFERENCE TO RELATED APPLICATIONS

This application does not claim the benefit of priority to any prior-filed application.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not applicable.

STATEMENT REGARDING PRIOR DISCLOSURES BY THE INVENTOR OR JOINT INVENTOR

The inventor did not disclose the invention herein prior to the 12 month period preceding the filing of this non-provisional application.

BACKGROUND OF THE INVENTION

(1) Field of the Invention

Commercial and industrial sites often require a concrete or asphalt slab be cored with a hole. Holes up to thirty-six inches in diameter or larger and depths of up to 16 inches or greater may be needed. For example, holes may need to be cored for the installation, maintenance and repair of floor drains, sewer drains/sewer tie-ins, HVAC openings, the installation, maintenance and repair of phone, electrical, cable, and fiber optic lines, the installation of handrails, the installation of lights and light poles, the installation of concrete safety barriers, the detection and repair of underground utilities and the installation of anchor holes. Concrete drum saws are utilized to core holes in concrete and asphalt for these and many more applications. Concrete drum saws can be expensive and consume significant resources of time and money. Additionally, concrete drum saws are difficult to operate and may require two or more operators at a time, leading to increased costs in man hours. The devices currently available for coring holes in concrete or asphalt are highly susceptible to binding, which interferes with the drum saw performance and can damage the drum saw.

The invention relates generally to an apparatus for cutting circular holes in concrete and asphalt for underground access or so equipment may be installed in the cut hole by conventional means. The device disclosed herein reversibly attaches to a skid steer, front loader, or other piece of heavy equipment. Additionally, this device may be reversibly attached to a water source and a hydraulic line and operated independently of a piece of heavy equipment. The apparatus utilizes a frame comprised of two or more supporting columns that steady the apparatus during use. The device allows a user to quickly set up the device and quickly drill a core out of a slab of concrete or asphalt, such as a road or parking lot. Although other devices are known in the art for drilling cores out of concrete and asphalt, these other devices typically require multiple users to safely operate them and they are less stable. A coring drill requires stability to prevent binding of the bit that slows the coring process.

(2) Description of Related Art

A number of hole coring saws are known in the art. Faircloth (U.S. Pat. No. 6,907,874 B1) discloses a machine that cuts holes in concrete slabs comprising a connector adapted to be secured in an adapter of a front-end loader. The device of Faircloth includes a first frame structure secured to the connector wherein the first frame structure includes an elongated tube and a support foot for engaging the surface of a concrete slab and supporting the first frame structure. The elongated tube includes a telescoping beam that slides back and forth allowing linear movement of an attached concrete hole cutting saw unit that includes a drum type concrete saw. Interconnected between the beam and the first frame structure is an actuator that moves the elongated beam and saw cutting unit back and forth between a retracted and extended position. The drum saw is moved laterally in respect to the front loader. The device of Faircloth has a number of deficiencies. Faircloth includes a single square mast that serves as both the carriage guide and the drive system. A group of rollers or bushings are utilized in an attempt to stabilize the carriage and a single or series of gears rides up and down a row of teeth attached to one side of the mast. Due to the placement of the row of teeth on the one side of the mast, there is little room for contact of the rollers or bushings on that side. The limited contact of the rollers or bushings crates a situation where there is insufficient support on that side allowing for significant movement of the support structure. This movement creates excessive wear on the rollers or bushings causing more movement, less support, and inevitable binding of the bit.

The single-mast system of Faircloth creates an extreme cantilever situation. For larger core bits, a series of spacers must be added increasing the length of the arm supporting the bit. The larger bits along with the motor, the motor mount, and the spacers can weigh hundreds of pounds. As with any lever, as the length of the arm increases, the downward force also increases and the instability becomes more severe causing more wear and more binding. The mast and rollers or bushings are simply not designed to handle that amount of stress. As the structural system breaks down, the core bit no longer travels in a parallel line with the mast creating a situation where the bit becomes pinched between the side walls of the substrate being cored (concrete, asphalt, etc.). When the friction becomes too great, the bit binds and can become stuck in the substrate causing increased wear on the machine, increased wear on the bit, increased time coring holes, and a potential safety hazard.

In order to stabilize the Faircloth saw for cutting, the machine requires significant time to position correctly because the device requires that both the front loader and the saw be positioned separately in a two-step process (Col. 2, 25-31); it is difficult to position both the front loader and the saw in the correct position to cut a hole in the desired location; the device may become unstable during operation unless the position of the drum saw is level with the position of the pair of supports 108 thus the device cannot be used in an area unless the full length of the device is level reducing the applications the device may be utilized; and the means to move the saw up and down to drill a hole is positioned several feet from the hydraulic controls which requires two people positioned at opposite ends of the device to operate the device. The device herein meets the deficiencies of the Faircloth device, and is stable, efficient, and cost saving.

Figure 20:
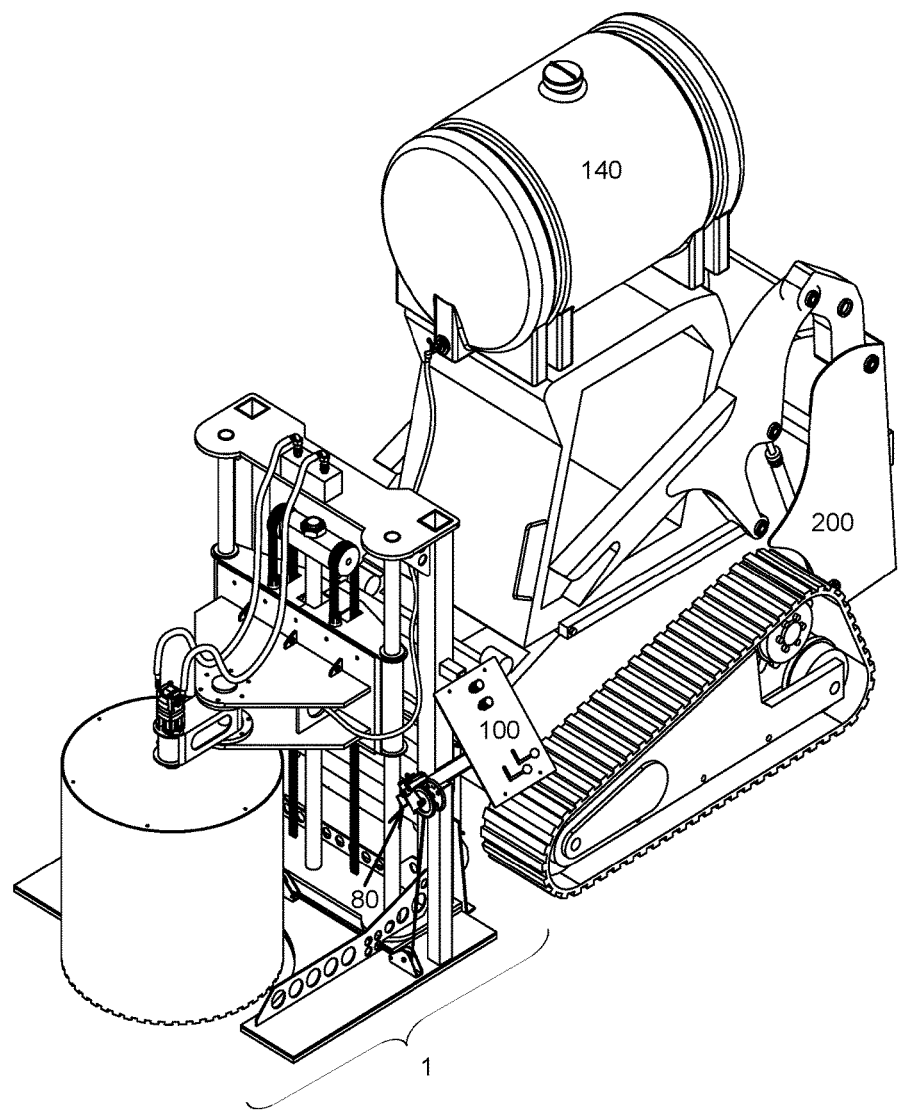

The two-post embodiment of the invention is shown installed onto a skid steer front loader in FIG. 20.

Figure 21:
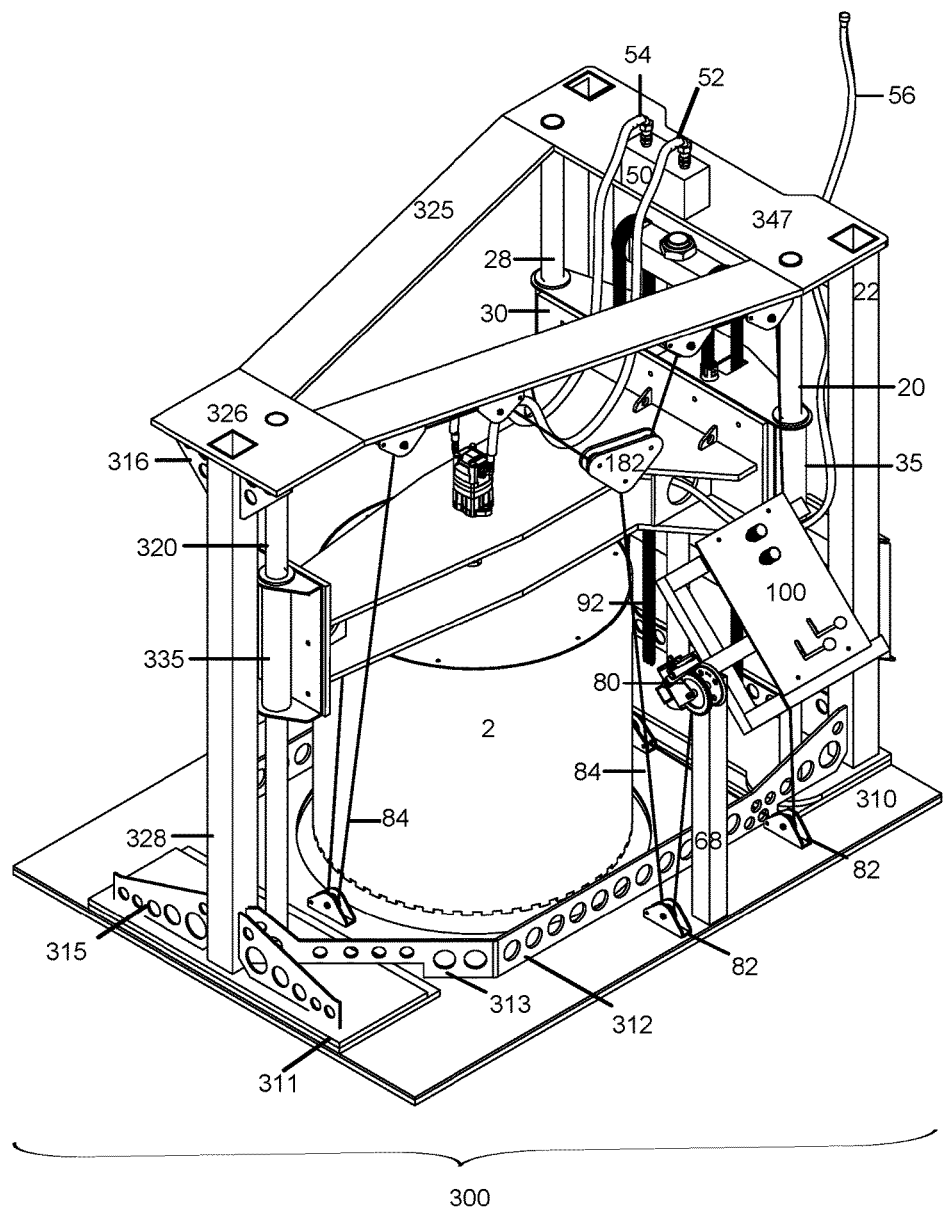
Figure 22:
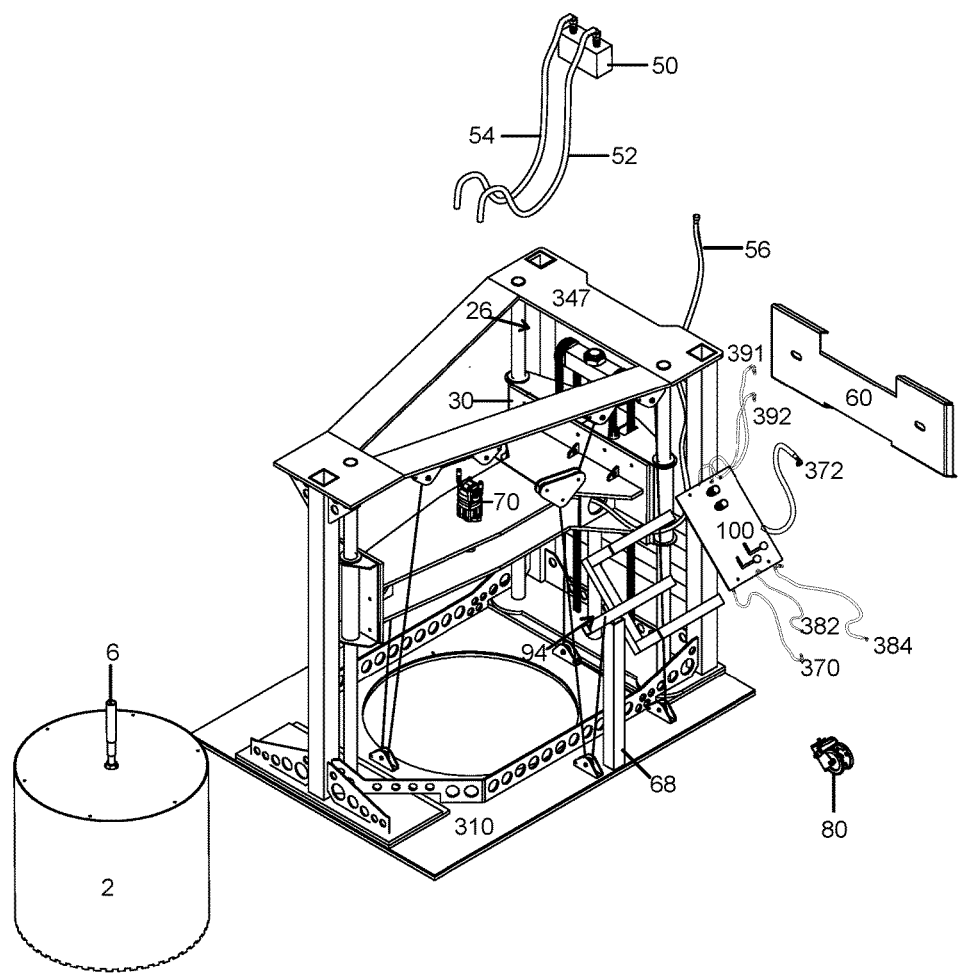

FIG. 21 depicts a side view of the three-post embodiment of the invention, while FIG. 22 depicts an exploded view of FIG. 21.

Figure 23:
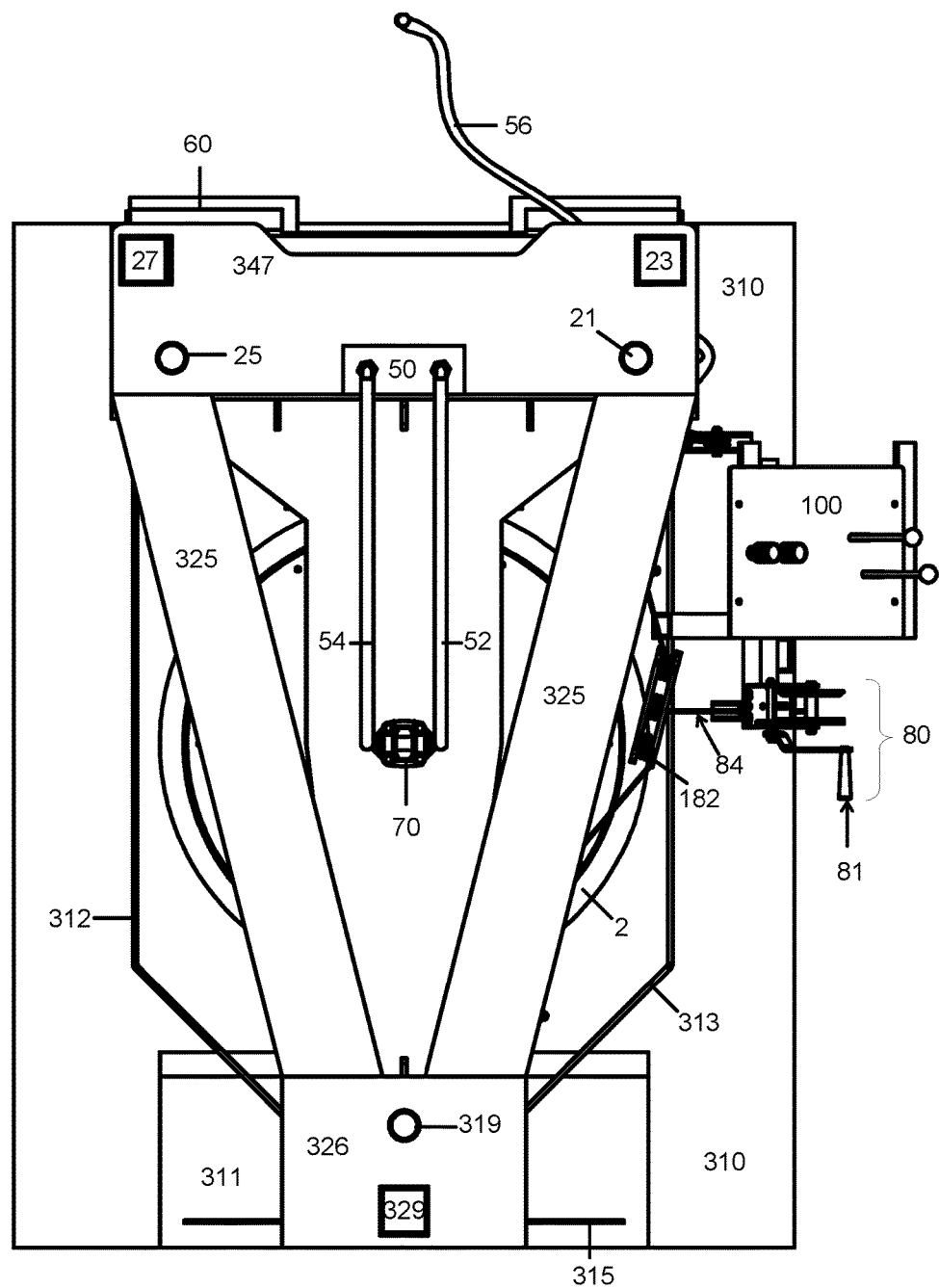

FIG. 23 illustrates a top view of the three-post embodiment.

Figure 24:
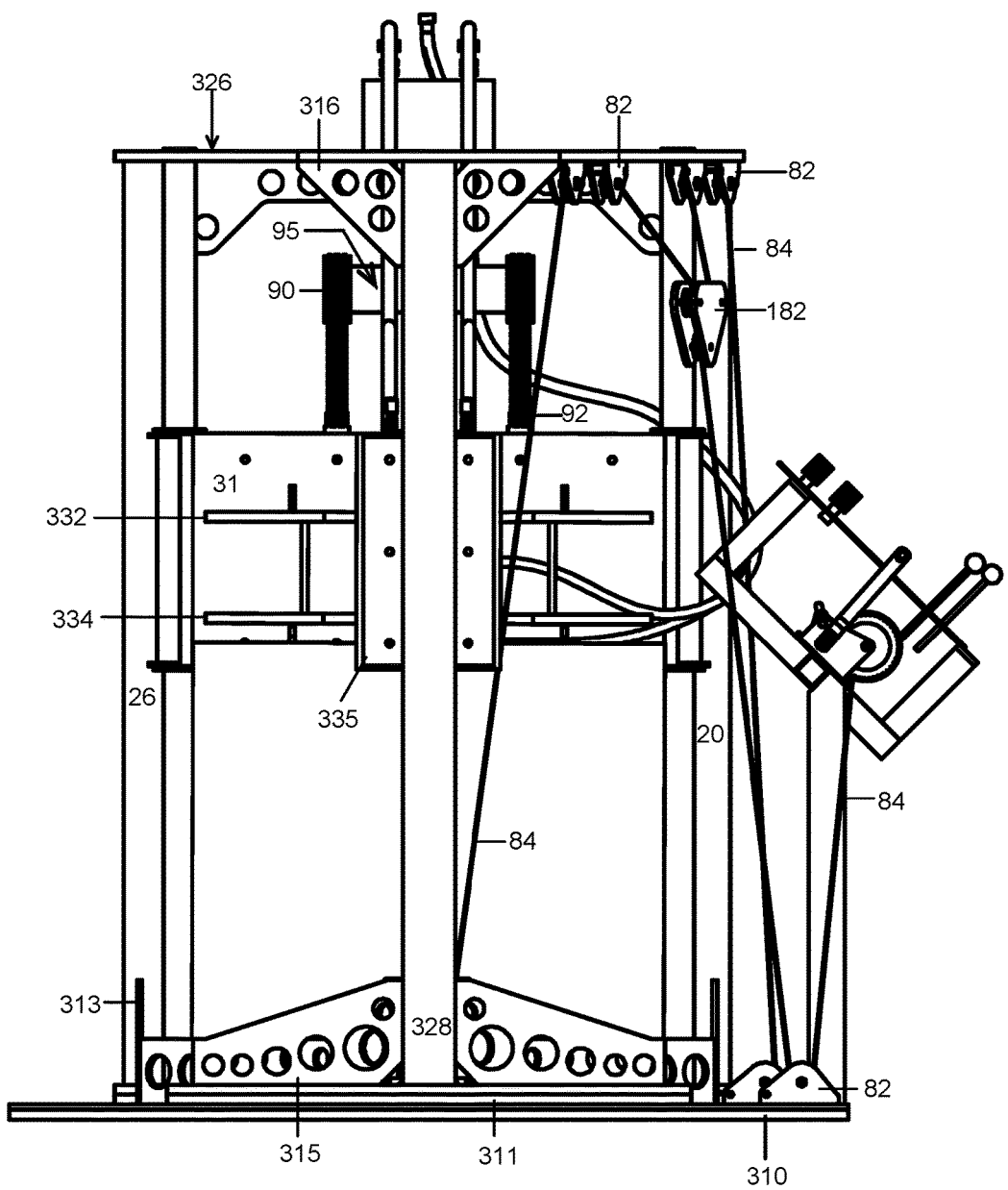

FIG. 24 illustrates a front view of the three-post embodiment.

Figure 25:
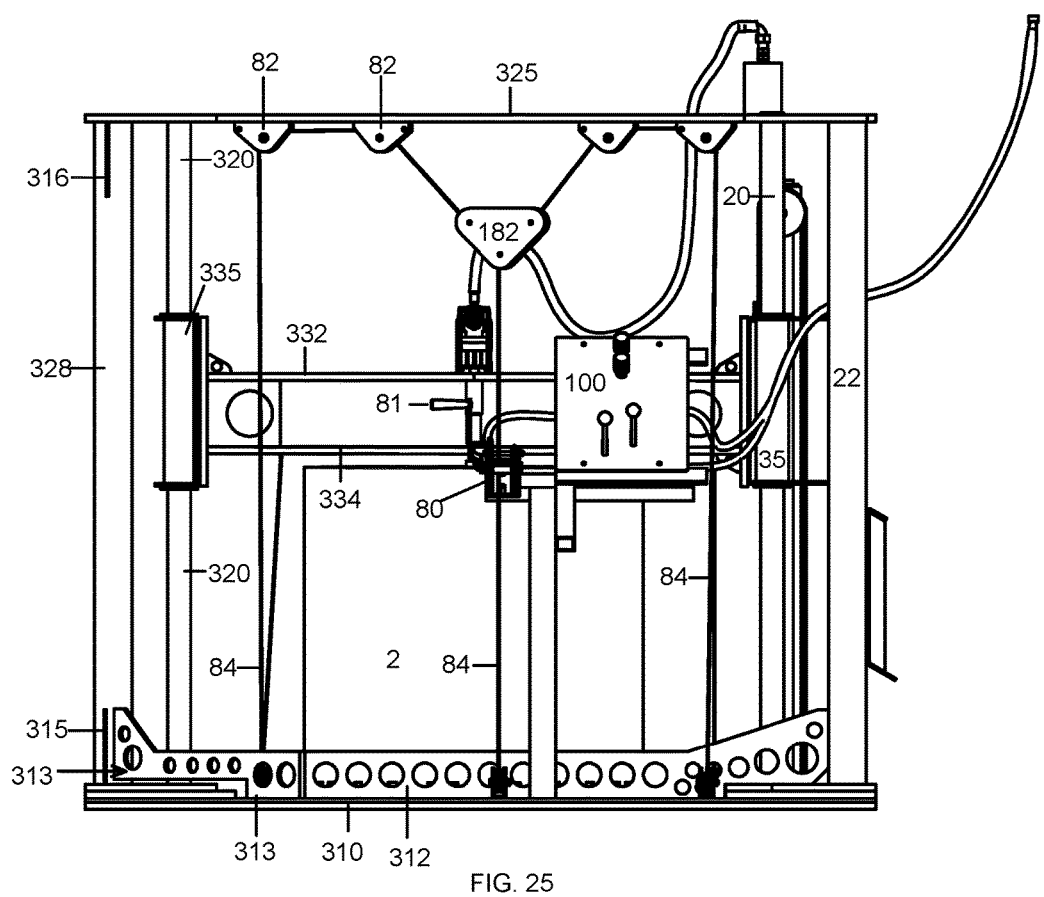

A side view of the three-post embodiment is depicted in FIG. 25.

Figure 26:
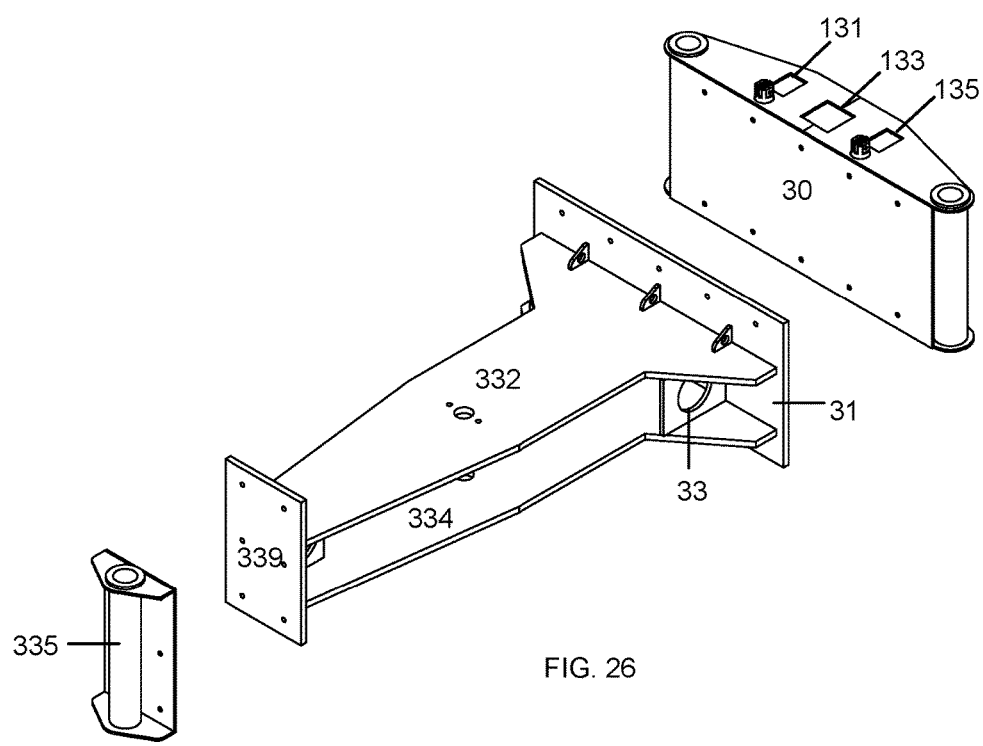

FIG. 26 illustrates the carriage mounting plate, the carriage, and the carriage front brace of the three-post embodiment.

Figure 27:
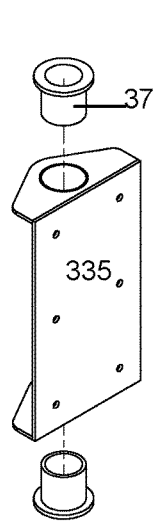
Figure 28:
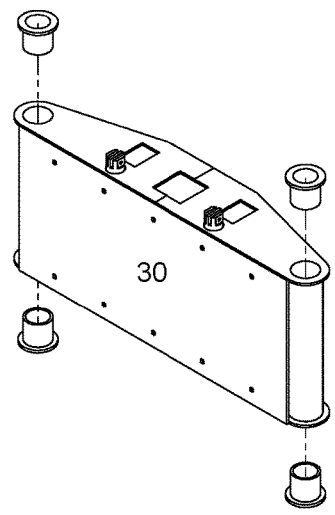

FIG. 27 illustrates the carriage front brace and FIG. 28 illustrates the carriage mounting plate of the three-post embodiment.

Figure 29:
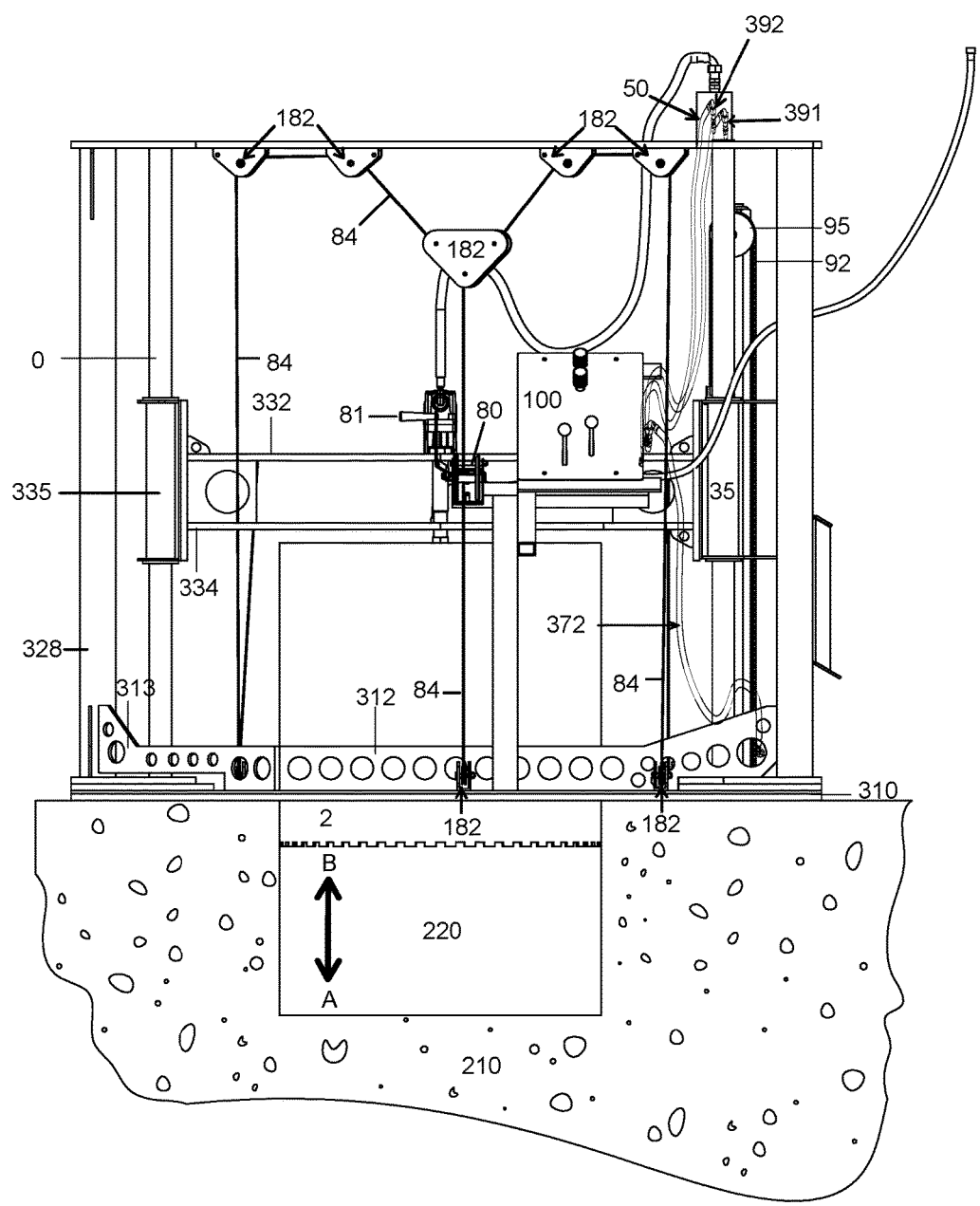

FIG. 29 depicts the three-post embodiment while coring a hole in a concrete slab.

Figure 30:
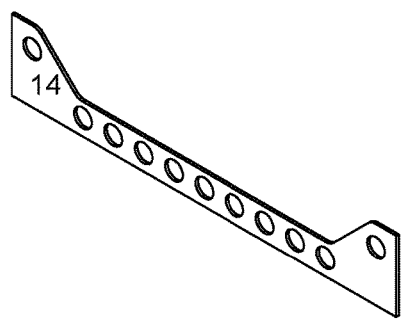
Figure 31:
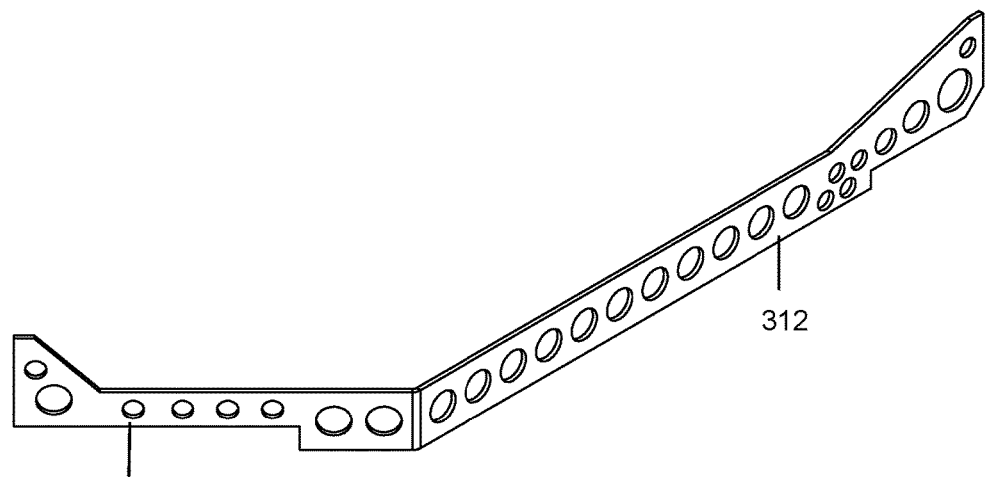

FIG. 30 illustrates the rear brace and FIG. 31 illustrates the front and side braces of the three-post embodiment.

Figure 32:
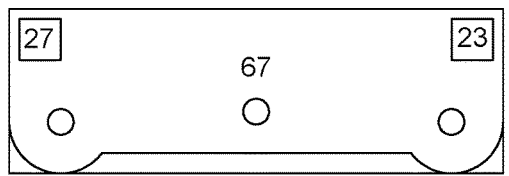
Figure 33:
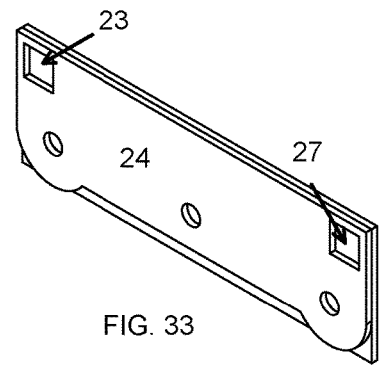

FIG. 32 depicts a top view and FIG. 33 depicts a side view of the top inside rear frame member of the three-post embodiment.

Figure 34:
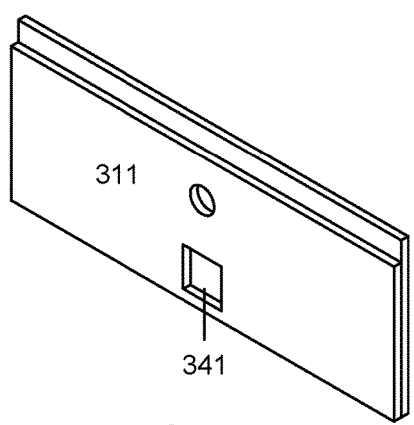
Figure 35:
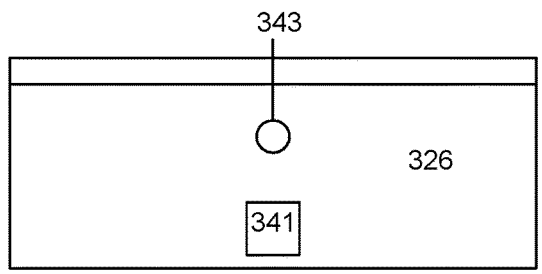

FIG. 34 illustrates a side view and FIG. 35 illustrates a top view of the top inside front frame member of the three-post embodiment.

Figure 36:
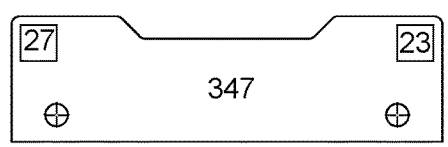
Figure 37:
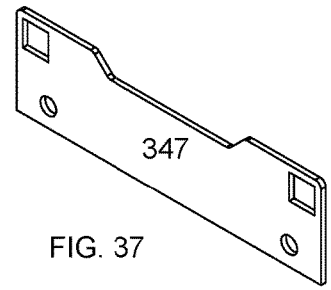

FIG. 36 depicts a top view and FIG. 37 depicts a side view of the exterior rear frame member of the three-post embodiment.

Figure 38:
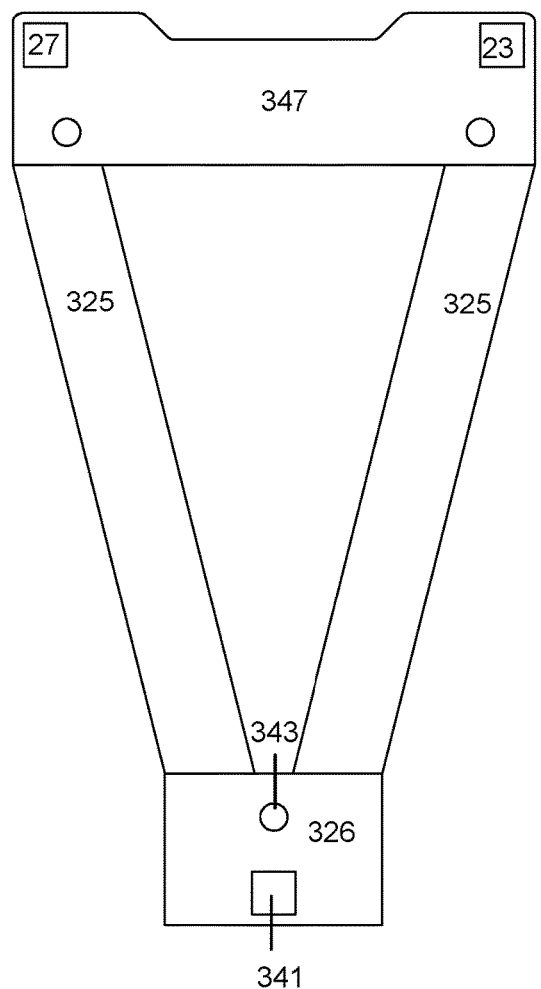

FIG. 38 depicts the full assembled exterior frame member of the three-post embodiment.

Figure 39:
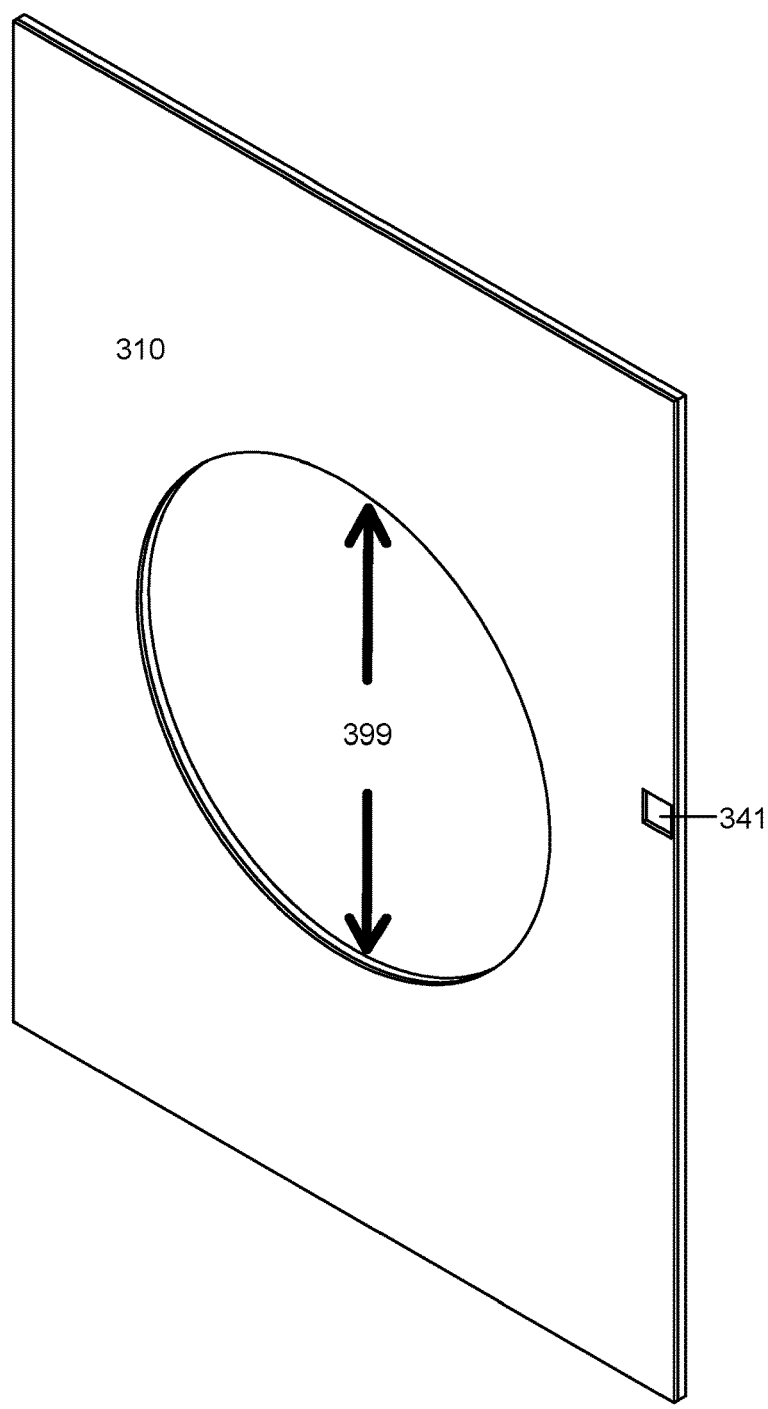

FIG. 39 depicts the base plate of the three-post embodiment.

Figure 40:
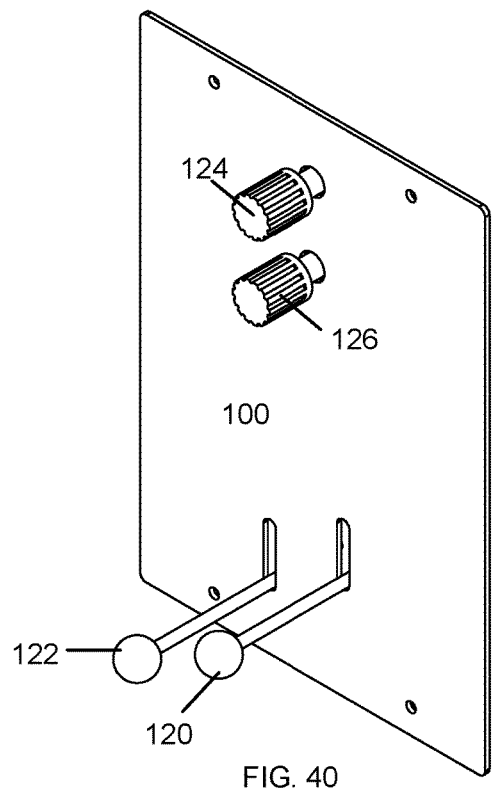
Figure 41:
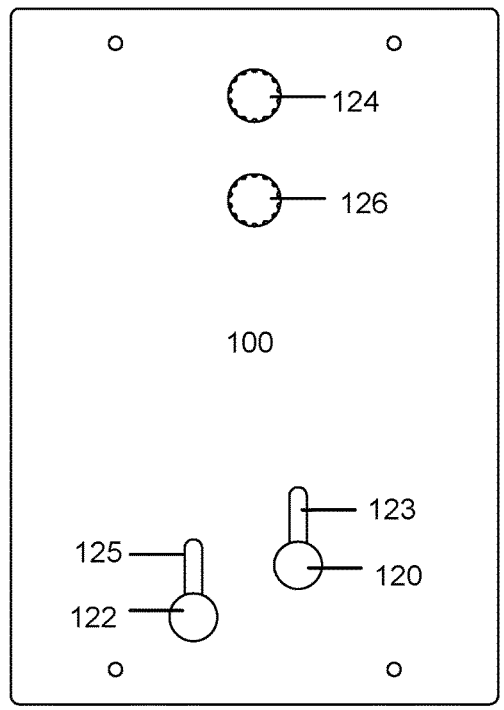

FIG. 40 depicts a side view and FIG. 41 depicts a front view of the hydraulic panel.

Figure 42:
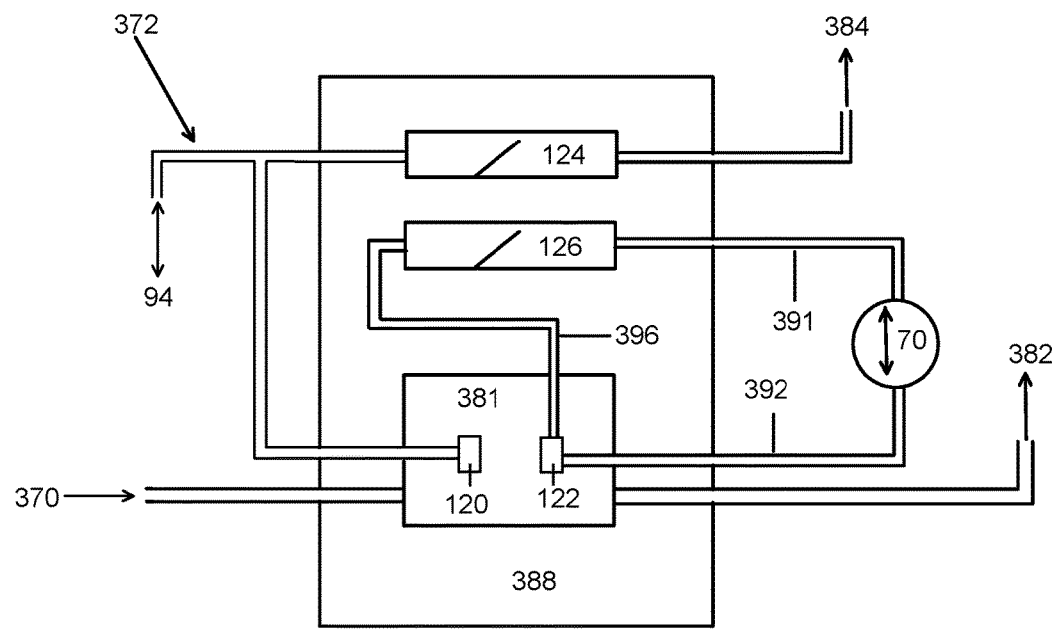

FIG. 42 depicts the front view and the rear view of the hydraulic panel.

Figure 43:
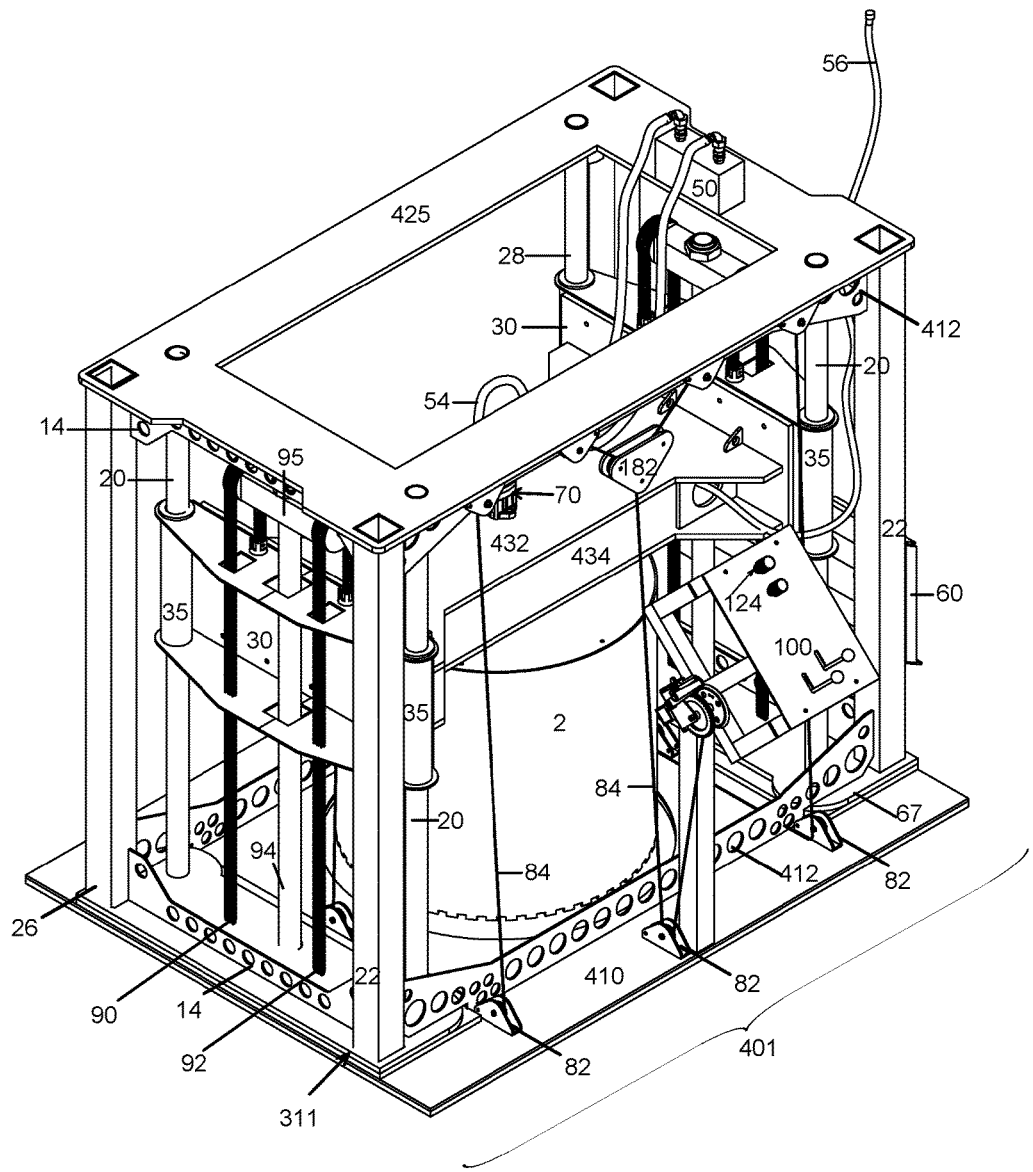

FIG. 43 depicts a side view of the four-post embodiment.

Figure 44:
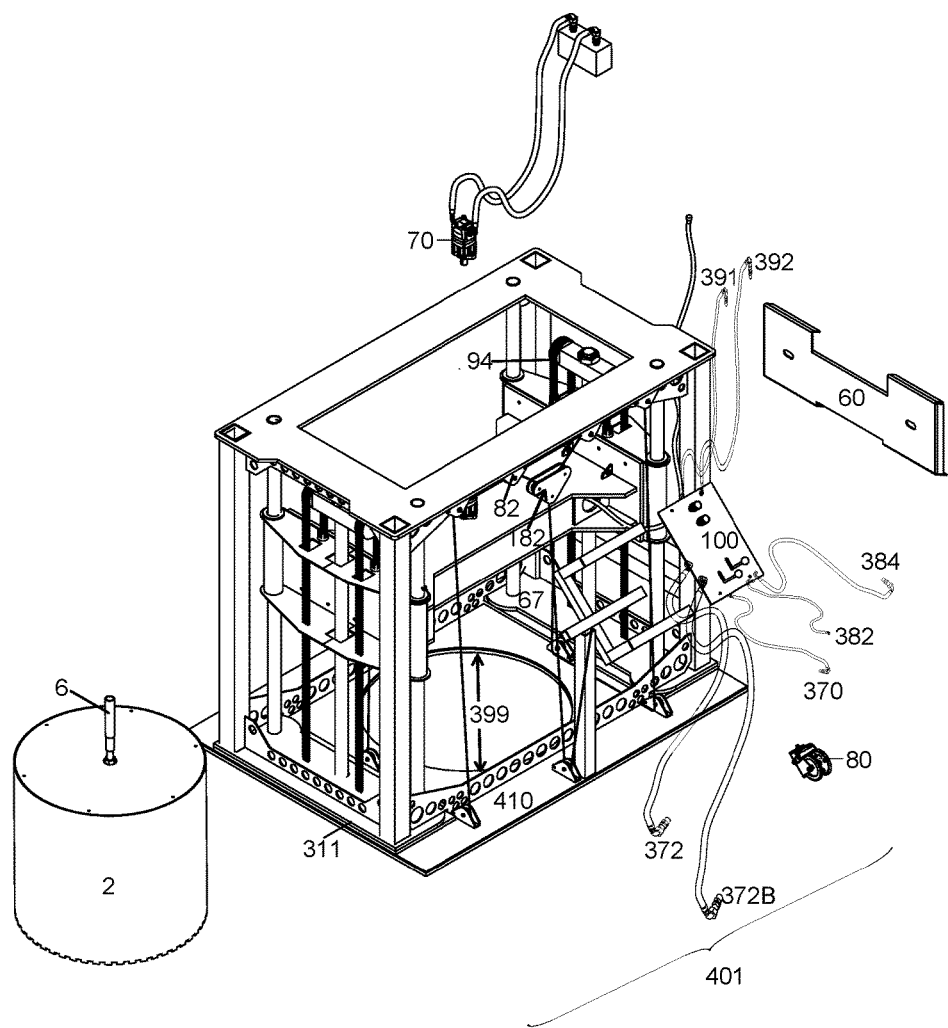

FIG. 44 illustrates an exploded view of FIG. 43.

Figure 45:
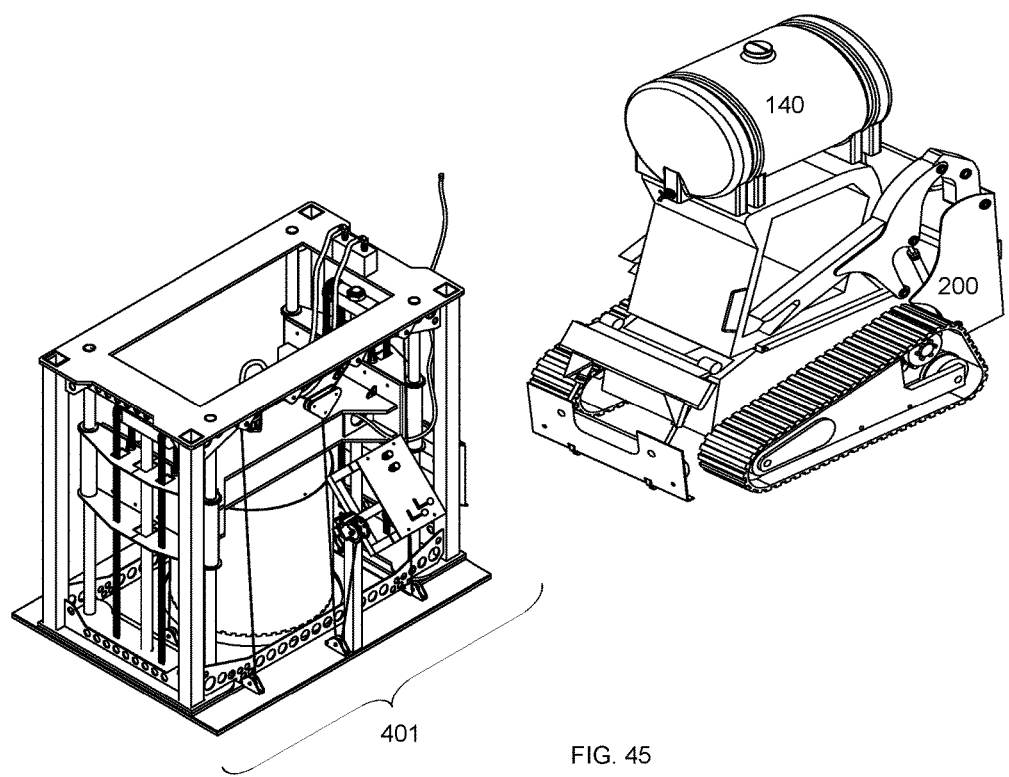

FIG. 45 illustrates the positioning of the four-post embodiment and a skid steer front loader.

Figure 46:
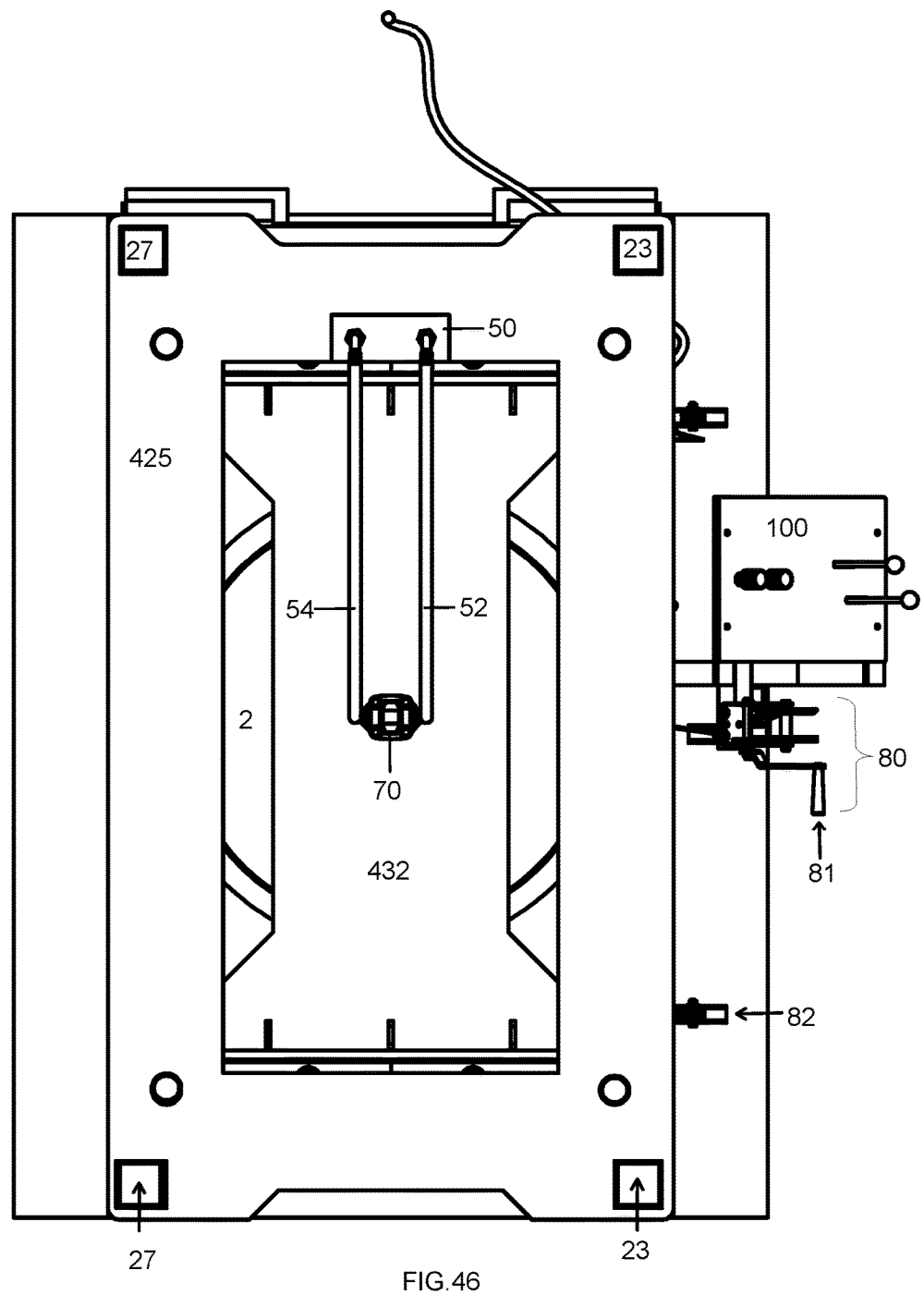
Figure 47:
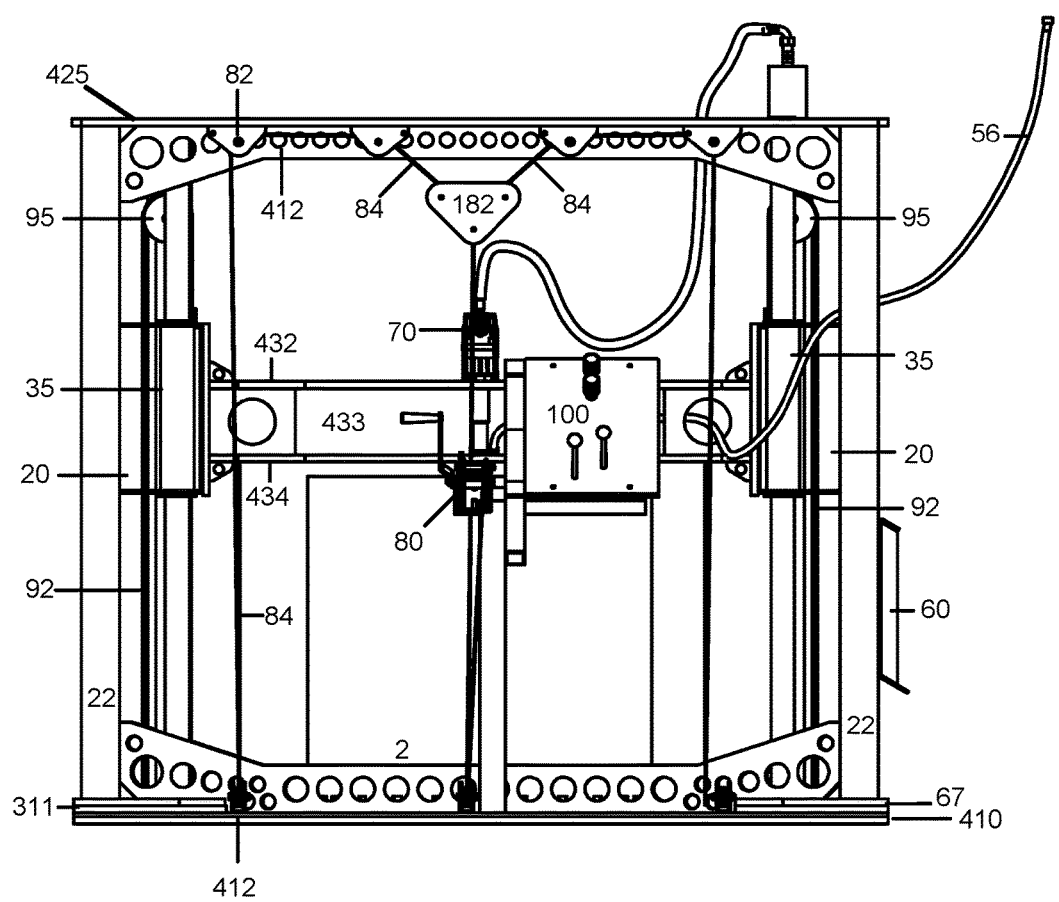

FIGS. 46 and 47 depict a top and side view of the four-post embodiment, respectively.

Figure 48:
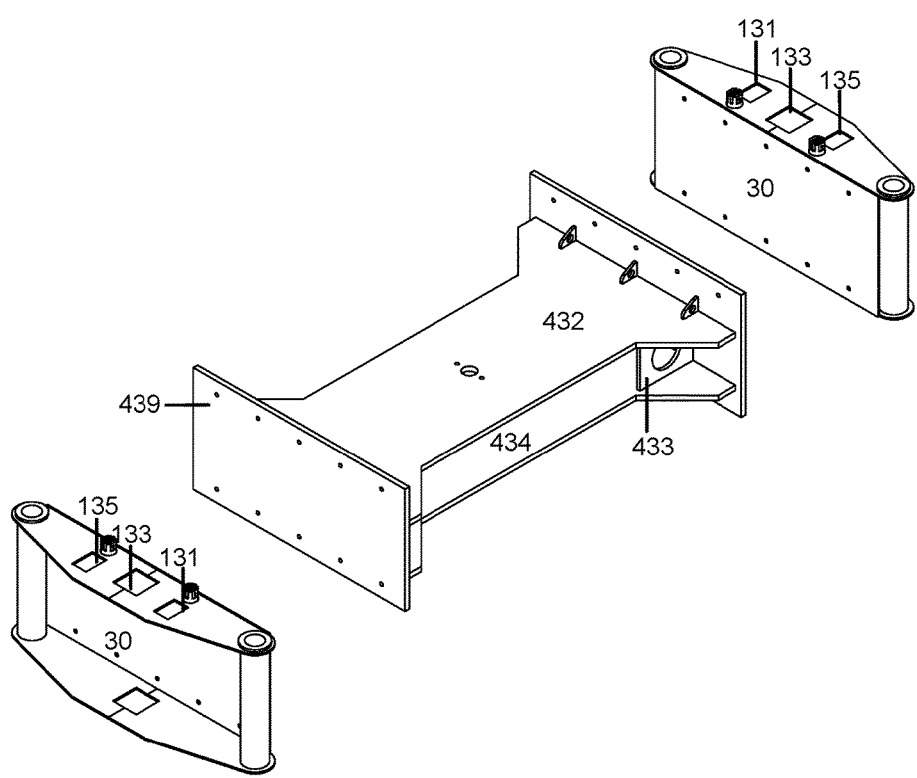

FIG. 48 illustrates an exploded view of the rear bracket, four-post embodiment carriage assembly, and four-post embodiment front bracket.

Figure 49:
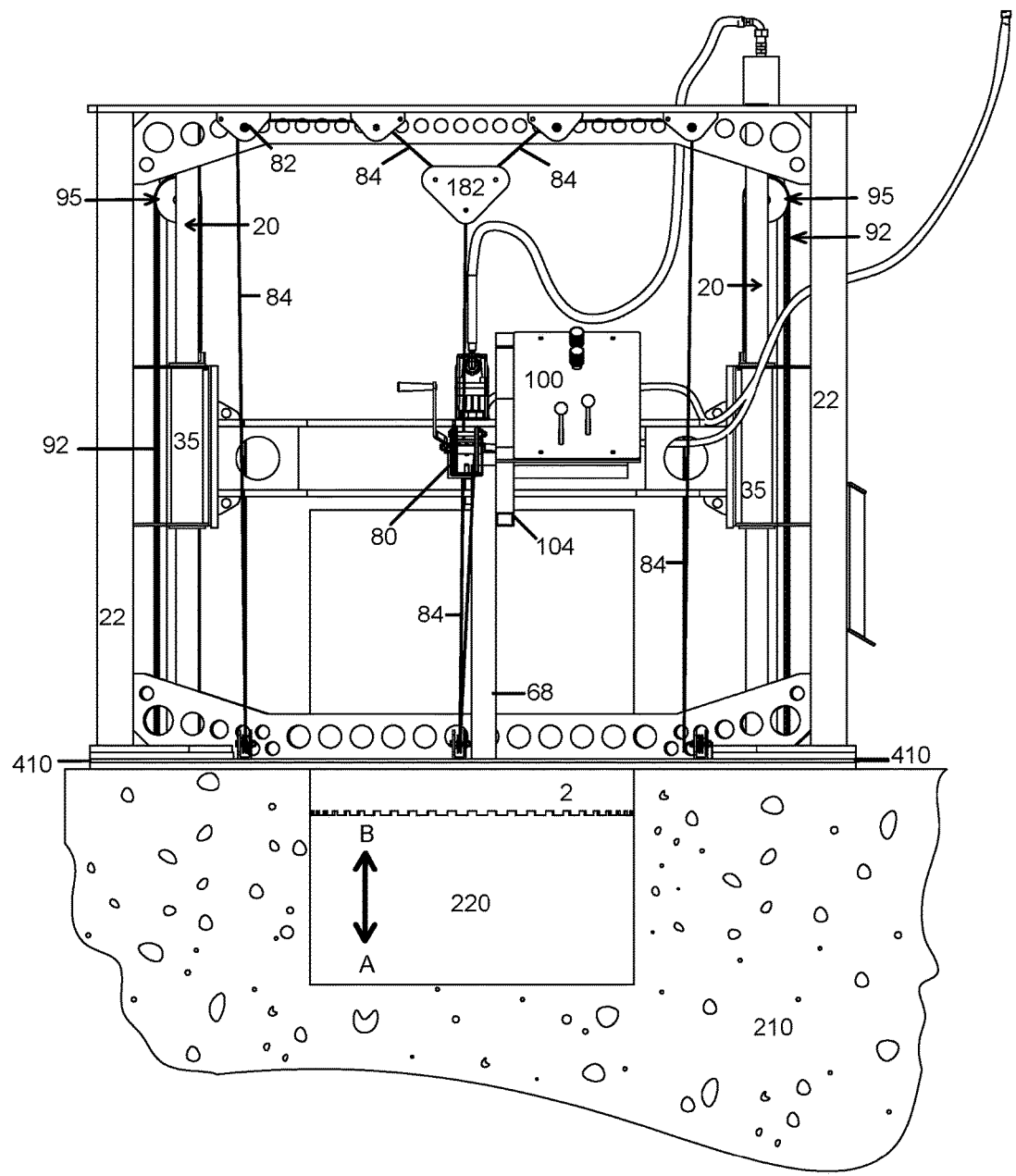

FIG. 49 illustrates the four-post embodiment coring a hole in a slab of concrete.

Figure 50:
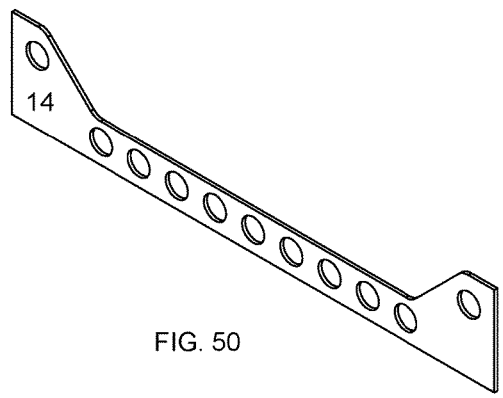
Figure 51:
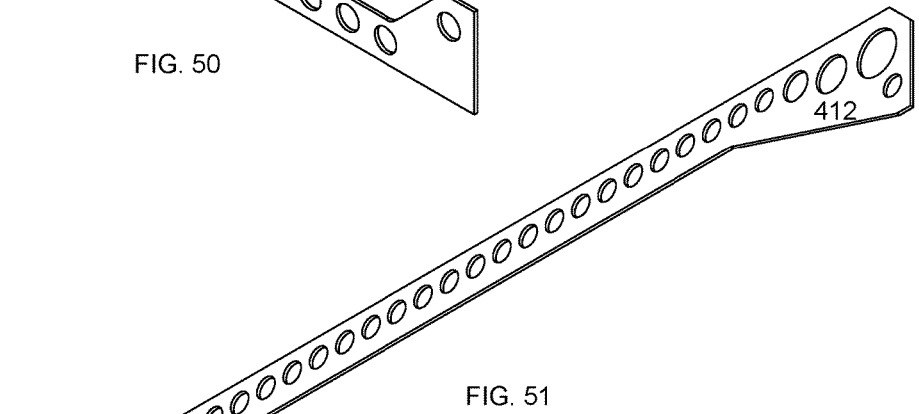
Figure 52:
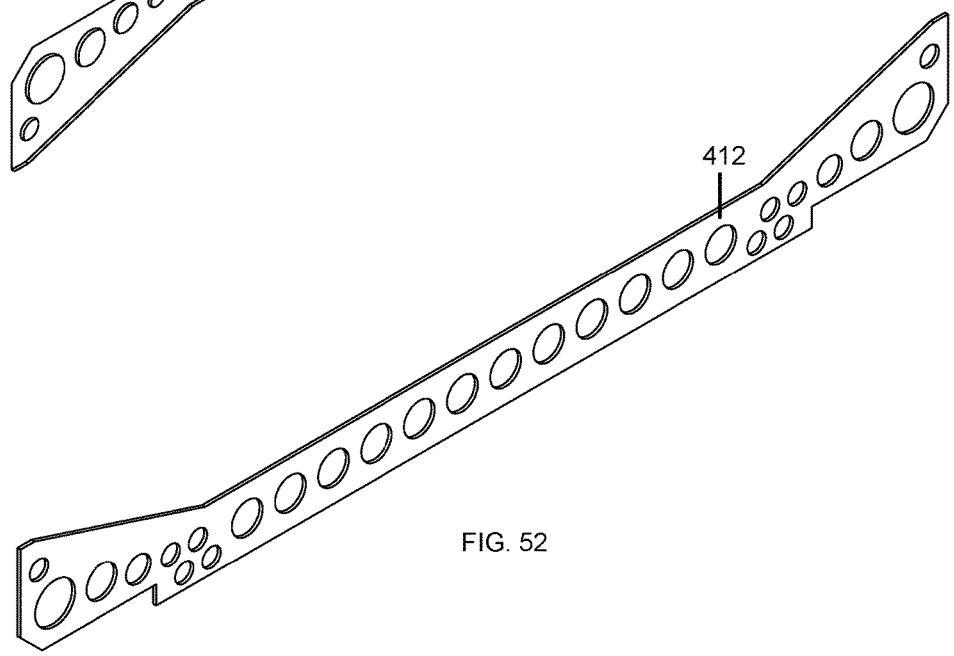

FIGS. 50, 51, and 52 depict the front, top side, and bottom side braces of the four-post embodiment.

Figure 53:
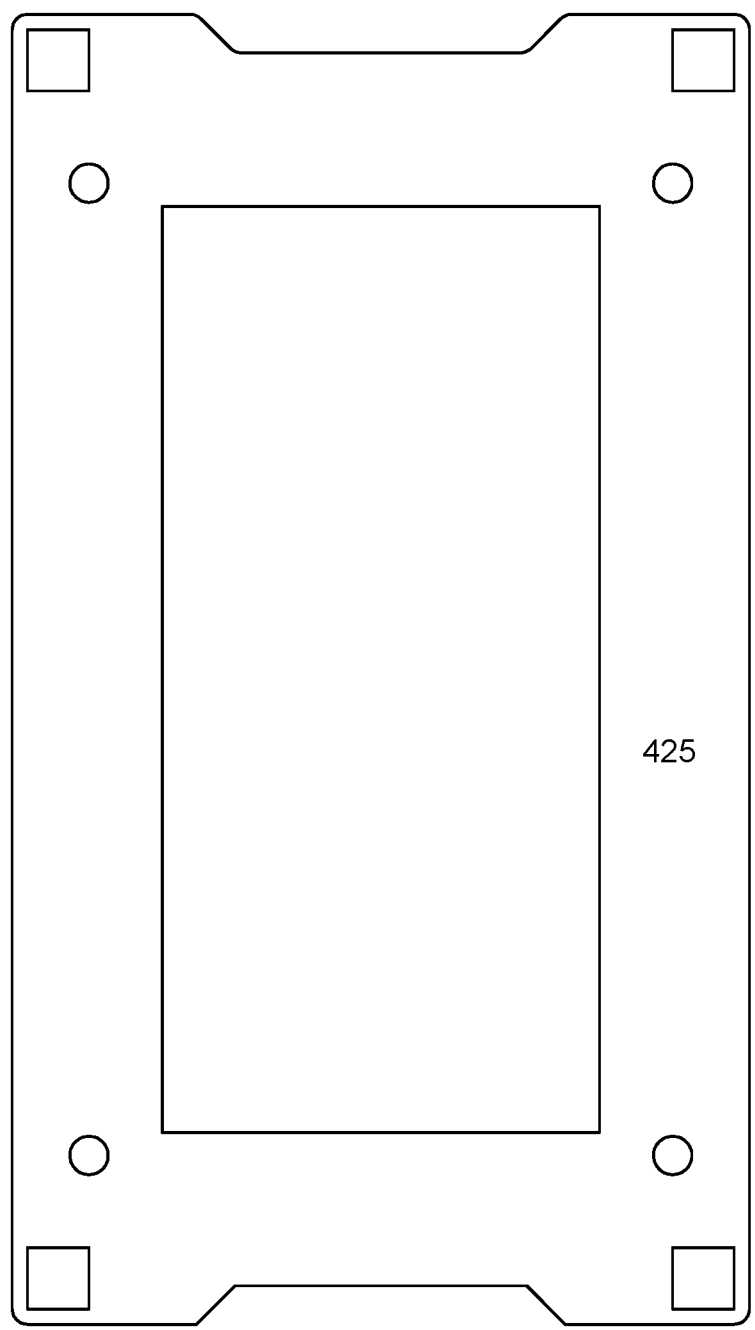

FIG. 53 illustrates the exterior frame member of the four-post embodiment.

Figure 54:
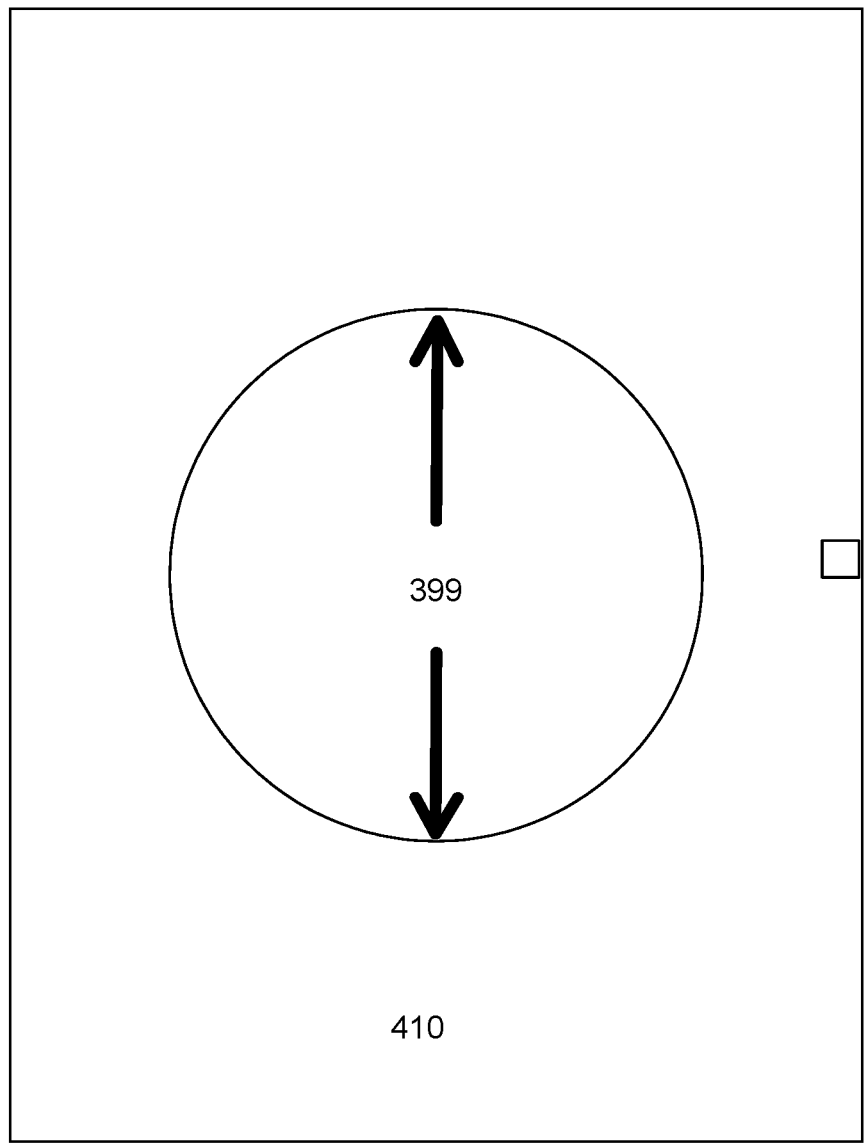

FIG. 54 depicts the base plate for the four-post embodiment.

Figure 55:
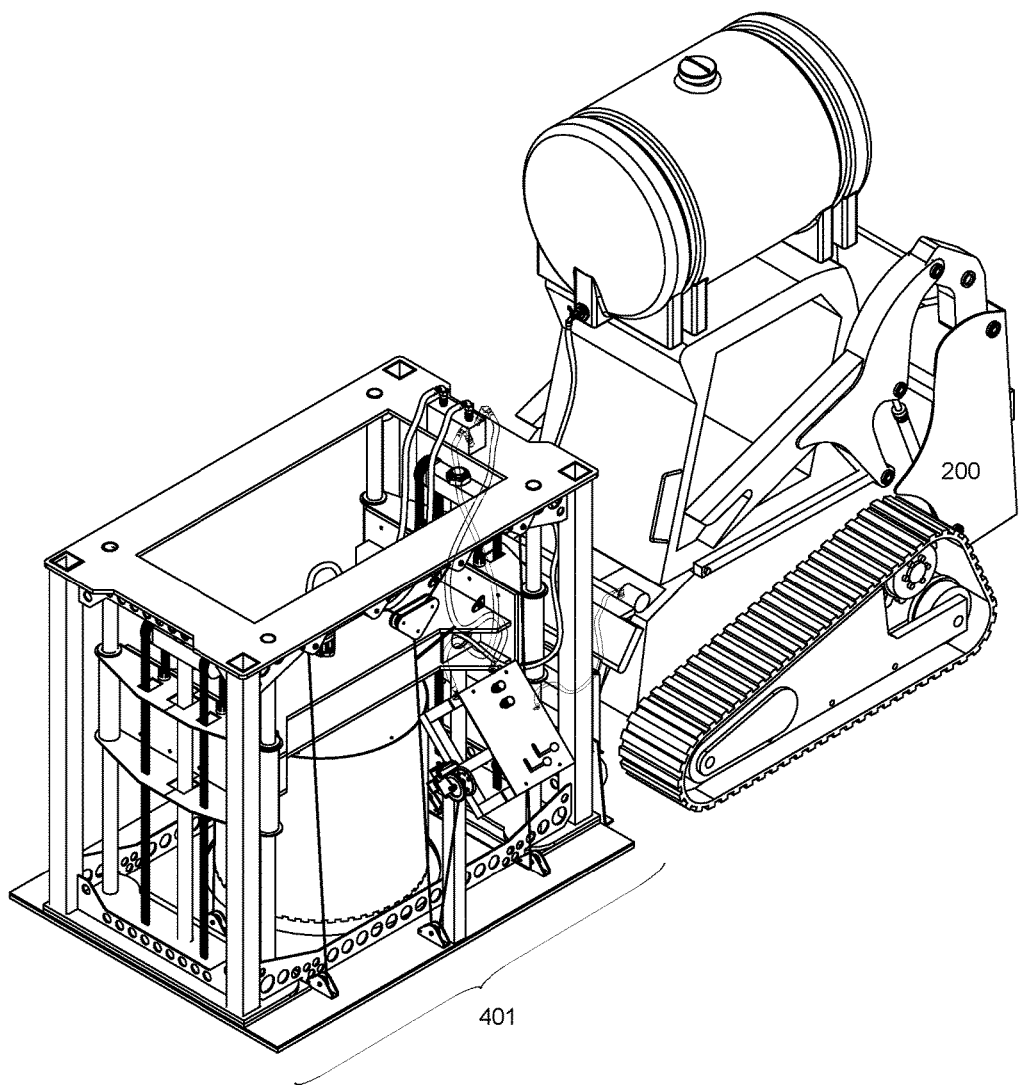

FIG. 55 depicts the four-post embodiment attached to a skid steer front loader.

DETAILED DESCRIPTION OF THE INVENTION

While this invention is susceptible of embodiment in many different forms, there are shown in the drawings and will herein be described in detail, several embodiments with the understanding that the present disclosure should be considered as an exemplification of the principles of the invention and is not intended to limit the invention to the embodiments so illustrated. Further, to the extent that any numerical values or other specifics of materials, etc., are provided herein, they are to be construed as exemplifications of the inventions herein, and the inventions are not to be considered as limited thereto.

The following description and drawings are illustrative and are not to be construed as limiting. Numerous specific details are described to provide a thorough understanding of the disclosure. However, in certain instances, well-known or conventional details are not described in order to avoid obscuring the description. References to one, or an, embodiment in the present disclosure can be, but not necessarily are, references to the same embodiment; and, such references mean at least one of the embodiments.

Reference in this specification to "one embodiment' or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, or is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

This disclosure includes three embodiments: two-post, three-post, and four-post embodiments. The two-post includes a frame assembly with two frame posts. The three-post version features a frame assembly with three frame posts, while the four-post embodiment includes four frame posts. However, the position of these posts could vary. For instance, the two-post version could have the posts to either side of the motor or front and back, the three-post version could have two posts to the sides of the motor or in front of the motor with a single post to the rear, etc.

The device herein comprises a frame assembly that reversibly attaches to a skid steer, front loader, heavy equipment, or, alternatively, can be freestanding. The frame assembly comprises a base member and vertical structure that attaches to a carriage assembly.

The carriage assembly connects the frame assembly to the drum saw, or core drilling bit via the articulating motor mount. The carriage assembly provides structural support for the drum saw. The carriage assembly moves relative to the frame assembly, which causes the drum saw to move relative to the surface of the concrete being cored.

The drum saw is powered by a drum saw motor and receives water from a tank, that may be mounted on the skid steer, or front loader. The drum saw motor receives hydraulic fluid from the skid steer via lines that are run from the skid steer through a control panel mounted on the frame assembly.

A cable system comprising two or more pulleys, a cable, and a winch are utilized to lower the drum saw on top of and into the concrete slab during operation of the device. This cable system is easy to use. A user simply spools or winds the cable onto the winch and along with gravity drives the drum saw down. However, the drive system could be either manual (via winch, gears, etc.), or hydraulic, electric, or other suitable means.

A drum saw may weigh hundreds of pounds. The hydraulic system of the skid steer is utilized to lift the drum saw up in an "OFF" position when the saw is not in use. This hydraulic system includes a hydraulic cylinder powered by the skid steer. This system is efficient and is easily performed by a user.

The "Heavy Equipment Concrete Core Drill Attachment" may comprise a two, three, or four-post frame assembly. The two-post frame assembly offers the greatest maneuverability while the four-post assembly is the most stable of the embodiments.

Figure 1:
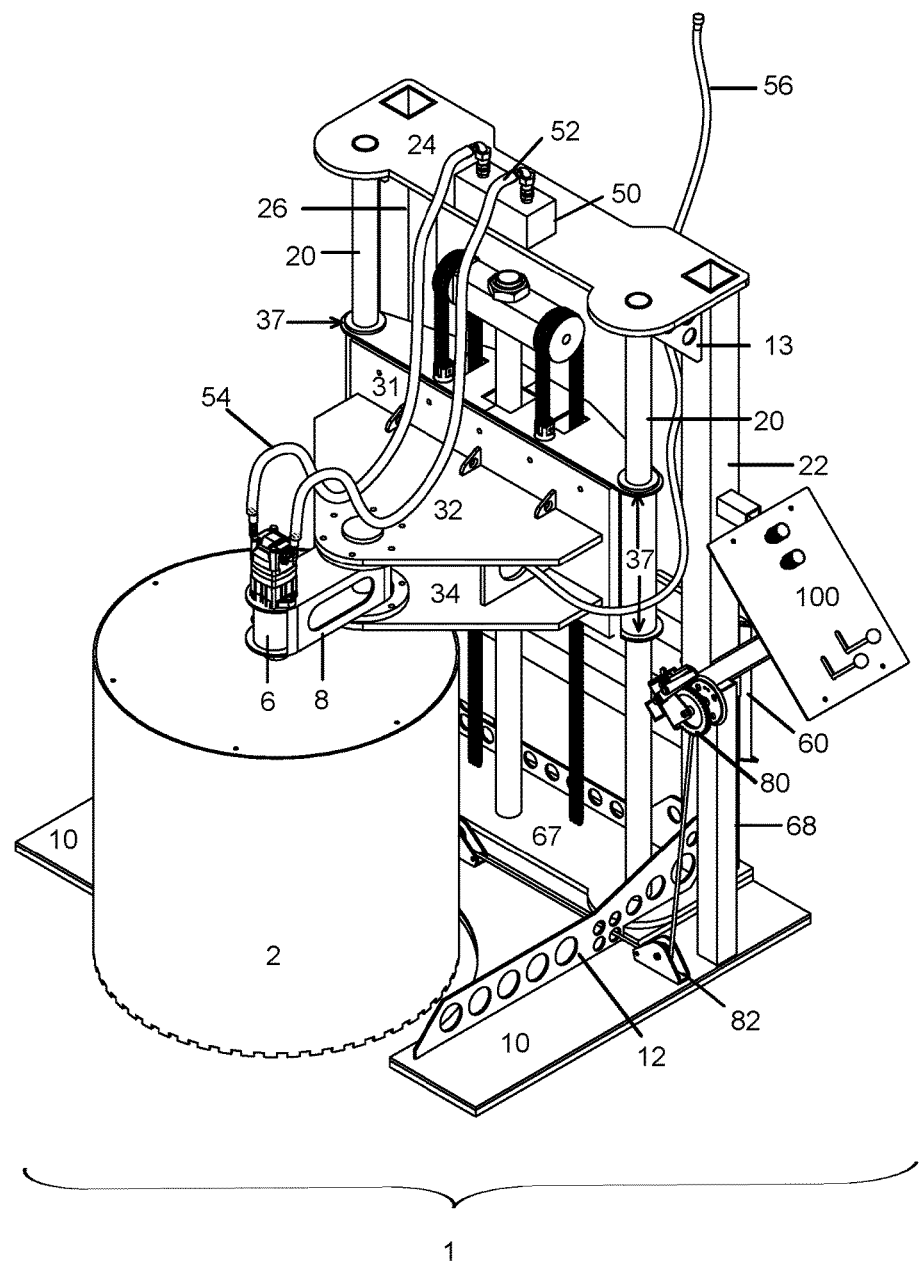
FIGS. 1 and 2 depict a side view of the two-post embodiment.
Figure 2:
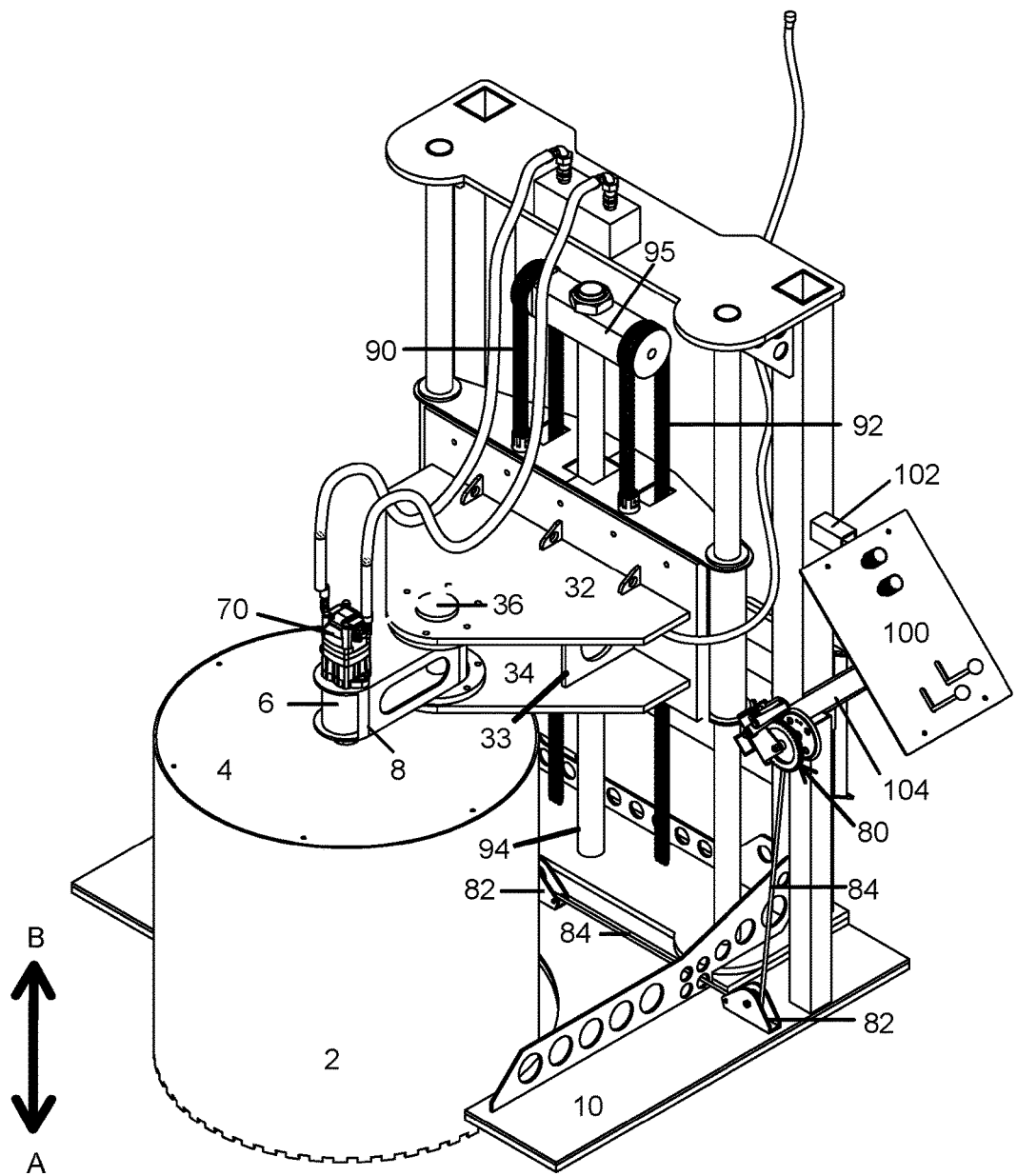

FIGS. 1 and 2 depict a side view of the two-post embodiment of the Heavy Equipment Concrete Core Drill Attachment 1. The frame assembly adds weight and stability to the drum saw. This increase in weight and stability reduces vibration, kickback, and binding from the drum saw while coring a hole. This device allows the drum saw to float up and down without binding allowing a hole to be cut in a fraction of the time it takes with the currently available devices. This extends the life of the drum saw, creates a cleaner cut, is more efficient, and is quicker.

FIG. 1 illustrates the frame assembly, carriage assembly, and drum saw wherein the drum saw is positioned onto the surface of a concrete slab. The frame assembly includes the following: base 10, one or more side brace(s) 12, one or more rear brace(s) 14, frame support columns 22 and 26, frame top 24, frame bottom 67, and skid steer attachment plate 60. Each of the parts comprising the frame assembly may be composed of steel, stainless steel, or other suitable material that is strong, durable, and suitable for outdoor environments. The base provides a stable footing for the frame assembly helping to prevent vibration and movement of the device during use. The side brace 12 shown in FIG. 1 is attached to base 10 and secures base 10 to frame support column 22. One rear brace 14 anchors onto frame bottom 67 and secures the frame support column 22 and support column 26 onto base 10 and secures frame support column 22 relative to frame support column 26. A second rear brace 14, which is at the top of the device, anchors onto frame top 24 and secures frame top 24 to both frame support column 22 and frame support column 26. The second rear brace 14 secures the upper length of frame support column 22 to the upper length of frame support column 26. Side brace 12 and rear brace 14 may include holes along their length that reduce the weight of the braces without reducing the strength of the braces.

Frame bottom 67 may be utilized to provide a foundation for frame support columns 22 and 26 and right and left carriage guide posts 20. Frame top 24 may be utilized to provide a top support for frame support columns 22 and 26 and right and left carriage guide posts 20 to firmly anchor them into the frame assembly. Frame support columns 22 and 26 provide structural integrity to the frame assembly and form the outer structure of the device. Skid steer attachment plate 60 is firmly attached to the frame assembly via attachment to frame support columns 22 and 26. Skid steer attachment plate 60 may be reversibly coupled to a skid steer, front loader, or other heavy equipment.

The carriage assembly includes carriage mounting plate 30, carriage top plate 32, carriage bottom plate 34, and articulating motor mount 8. All parts comprising the carriage assembly may be composed of steel, stainless steel, or other suitable composition that is strong, durable, and resistant to environmental conditions. The carriage assembly fits onto right and left carriage guide posts 20 via rear carriage mounting plate 30 (not shown) and the four carriage guide post bushings 37. Rear carriage mounting plate 30 is attached to front carriage mounting plate 31 to support the carriage assembly. Carriage top plate 32 and carriage bottom plate 34 secure articulating motor mount 8 onto the carriage assembly. Water line 56 may be threaded through the carriage assembly.

The drum saw includes the drum saw bit 2, drum saw bit top 4, and pillow block 6. FIG. 1 depicts drum saw bit 2 aligned with the surface of the concrete slab. Drum saw bit 2 will be in this position both before and after coring a hole into a concrete slab, concrete decking, asphalt parking lot, etc.

A number of pulleys 82 attach to the base 10 and assorted frame assembly parts. Winch 80 may be located near control panel 100 so that a single user can easily control the action of the drum saw. Winch 80 and control panel 100 allow a user to control the movement and coring action of drum saw bit 2. Control panel 100 is attached to the frame assembly via frame post 68. Water line 56 supplies water to the drum saw bit 2 at pillow block 6. Hydraulic junction box 50 facilitates the movement of hydraulic fluid through hydraulic motor supply hose 52 that supplies hydraulic fluid to the motor and hydraulic hose motor return hose 54 that returns hydraulic fuel from the motor.

FIG. 2 is a side view of the two-post embodiment. Drum saw bit 2 is shown coring a hole in a concrete slab. The cutting edge (jagged edge) of drum saw bit 2 is below the horizontal plane of base 10. Multiple pulleys 82 are shown with cable 84. Cable 84 runs from pulley to pulley to winch 80. The rotation of winch 80 by a user causes cable 84 to move relative to each pulley 82, which causes the movement of the carriage assembly, and ultimately, the movement of drum saw bit 2. The movement of cable 84 so that it spools onto winch 80, causes the carriage assembly to move in the "A" direction, and the drum saw bit 2 to move in the "A" direction so that it cores a hole into a concrete slab. Hydraulic cylinder 94 causes the carriage assembly to move in the "B" direction and drum saw bit 2 to move in the "B" direction retracting drum saw bit 2 from the cored hole in the concrete slab. Cable 84 may be threaded through holes in side brace 12.

Motor 70 receives hydraulic fluid from hydraulic junction box 50 via hydraulic motor supply hose 52. Hydraulic fluid is returned to hydraulic junction box 50 through hydraulic motor return hose 54. Pillowblock 6 is coupled to motor 70, which is coupled to the drum saw. Motor 70 causes the drum saw and drum saw bit 2 to rotate in a circular path causing the coring of a hole into a concrete slab. Pillow block 6 fits within articulating motor mount 8. Articulating motor mount 8 may be secured into the carriage assembly via carriage pin 36 that traverses carriage top plate 32 and carriage bottom plate 34. One or more carriage support(s) 33 may be used to connect carriage top plate 32 and carriage bottom plate 34 providing strength and structural integrity to the carriage assembly. Carriage support 33 may be positioned in any suitable location that provides structural integrity to the carriage assembly. Carriage support 33 may include one or more openings or holes that allow hoses, such as water line 56, to traverse the carriage assembly.

Hydraulic cylinder 94 runs from frame bottom 67 to "T" bar 95. Hydraulic cylinder 94 is a mechanical actuator that uses pressurized hydraulic fluid, such as oil, to move a piston contained within it. The movement of the piston (not shown) causes the movement of both the right carriage drive chain 90 and the left carriage drive chain 92 over and around "T" bar 95. A number of hydraulic cylinders are commercially available and are suitable for this application. Hydraulic cylinder 94 may utilize the hydraulic pump located on the skid steer or other front loader. Skid steers and many front loaders are designed so that the hydraulic pump located and powered by the skid steer may be utilized to provide pressurized hydraulic fluid to an attachable device, such as the device herein. Both right carriage drive chain 90 and left carriage drive chain 92 are anchored onto frame bottom 67 and carriage mounting plate 30. Both right carriage drive chain 90 and left carriage drive chain 92 move carriage mounting plate 30 in both the "A" and "B" direction in response to the movement of pressurized hydraulic fluid through hydraulic cylinder 94. The right and left carriage drive chains, 90 and 92, move drum saw bit 2 in the "A" direction to core a hole into a concrete slab and in the "B" direction to remove drum saw bit 2 from the cored slab of concrete. The right and left carriage drive chains 90 and 92 allow the bit to go in the "A" direction, but gravity and/or winch 80 moves it.

Control panel lateral support 102 and control panel arm 104 support control panel 100 so that it is easily accessible to a user. Control panel lateral support and control panel arm 104 may be in any configuration that places control panel 100 in a position that allows a user to safely and quickly access control panel 100. Control panel arm 104 may be adjustable to allow a user to tilt control panel 100 so that it is clearly visible and easily accessed.

Figure 3:
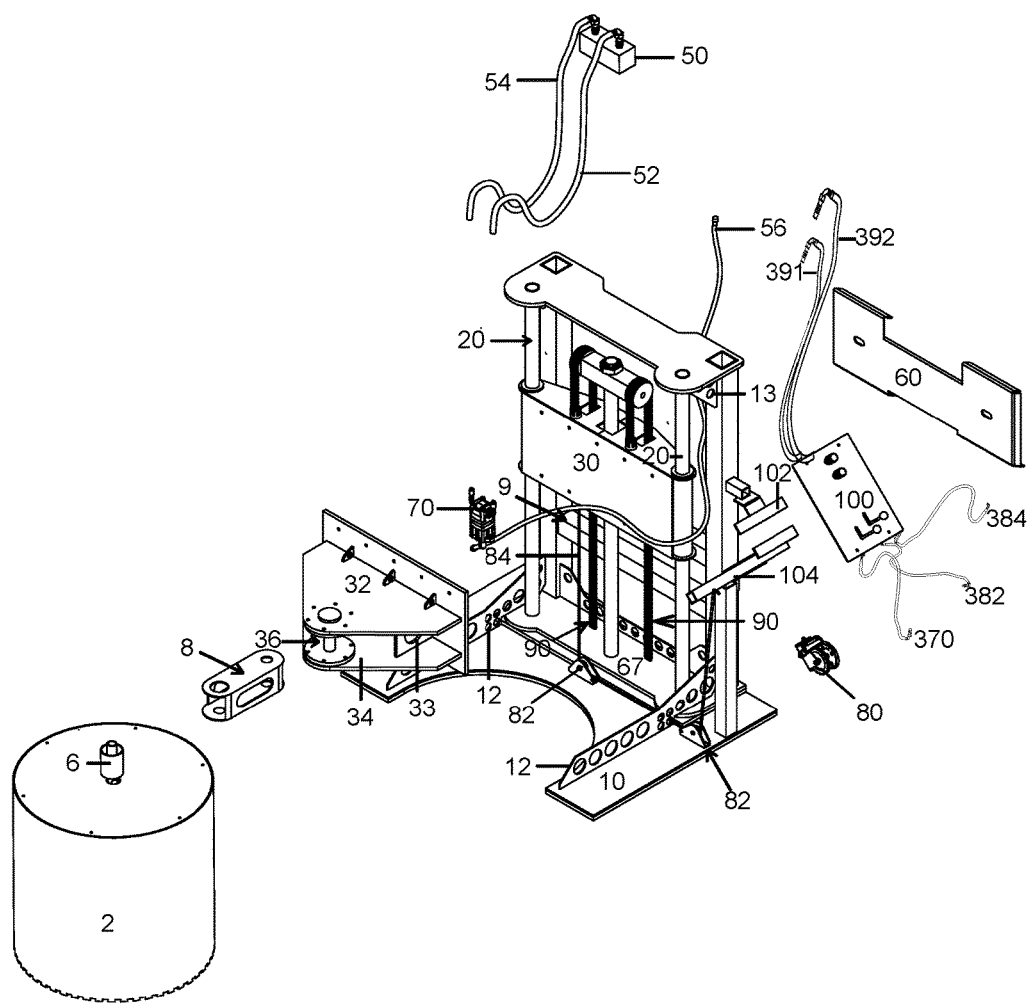
FIG. 3 depicts an exploded side view of the two-post embodiment.

FIG. 3 illustrates an exploded view of the two-post embodiment. Drum saw bit 2 and pillow block 6 are shown separated from the frame assembly. The articulating motor mount 8 is shown detached from the carriage pin 36, which couples carriage top plate 32 and carriage bottom plate 34. Carriage support 33 is shown welded onto the bottom side of carriage top plate 32 and the top side of carriage bottom plate 34. Motor 70 and water line 56 are shown detached from the carriage assembly. Both right carriage drive train 90 and left carriage drive train 92 are shown anchored onto frame bottom 67. Carriage mounting plate 30 is positioned onto carriage guide post 20. Carriage mounting plate 30 moves vertically up and down the length of carriage guide post 20. Base 10 includes two side braces 12 that secure it onto the frame assembly. Additionally, the frame assembly includes two rear braces 14, one at the top of the frame assembly and one at the base of the frame assembly.

Control panel 100 is shown detached from control panel lateral support 102 and control panel arm 104. The following hydraulic hoses/lines originate from the rear of control panel 100: hydraulic junction box supply hose 391 that supplies hydraulic fluid to hydraulic junction box 50, hydraulic junction box return hose 392 that receives hydraulic fluid from the junction box, hydraulic main supply hose 370 that receives hydraulic fluid from the skid steer (not shown), hydraulic return hose 382 that returns hydraulic fluid to the skid steer hydraulic reservoir (not shown), and hydraulic auxiliary return hose 384 that return hydraulic fluid to the skid steer hydraulic reservoir (not shown). Hydraulic junction box 50, hydraulic motor supply hose 52, and hydraulic motor return hose 54 are detached from the frame assembly.

Two pulleys 82 are attached to base 10. A number of pulleys 82 may be attached in various areas of the frame assembly. Cable 84 is positioned through pulleys 82. Winch 80 is detached from the frame assembly. Frame horizontal support 9 provides structural integrity to the frame assembly. Skid steer attachment plate 60 is detached from the frame assembly. In some embodiments, frame skid steer attachment plate 60 attaches to the frame assembly via frame horizontal support 9.

Figure 4:
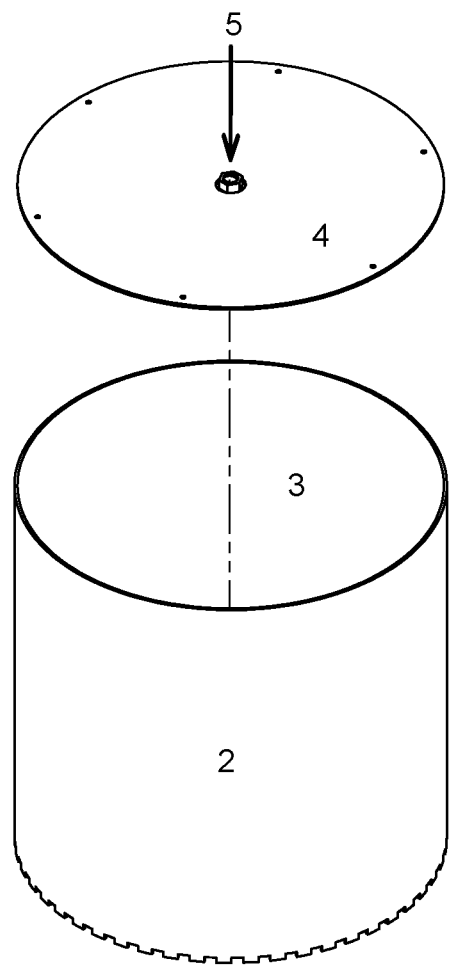
FIG. 4 illustrates an exemplary drum circular saw.

FIG. 4 depicts the drum saw. Drum saw bit 2 includes saw edges opposite drum saw bit top 4 that enable the device to core a hole through a concrete slab. Drum saw cavity 3 is the size and shape that the cored concrete removed from the concrete slab will have. Pillow block 6 (shown in FIGS. 1 and 2) anchors onto the drum saw via threaded hub 5.

Figure 5:
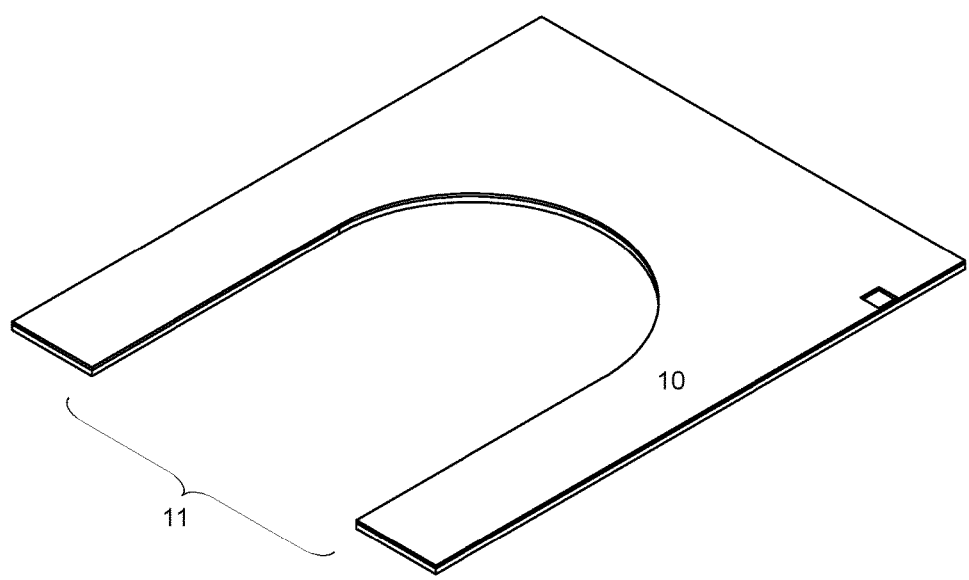
FIG. 5 illustrates a top, angled view of the two-post embodiment base plate.

The frame assembly base 10 is illustrated in FIG. 5. Frame base 10 includes opening 11 provides sufficient space for the movement of the drum saw vertically in respect to the frame assembly.

Figure 6:
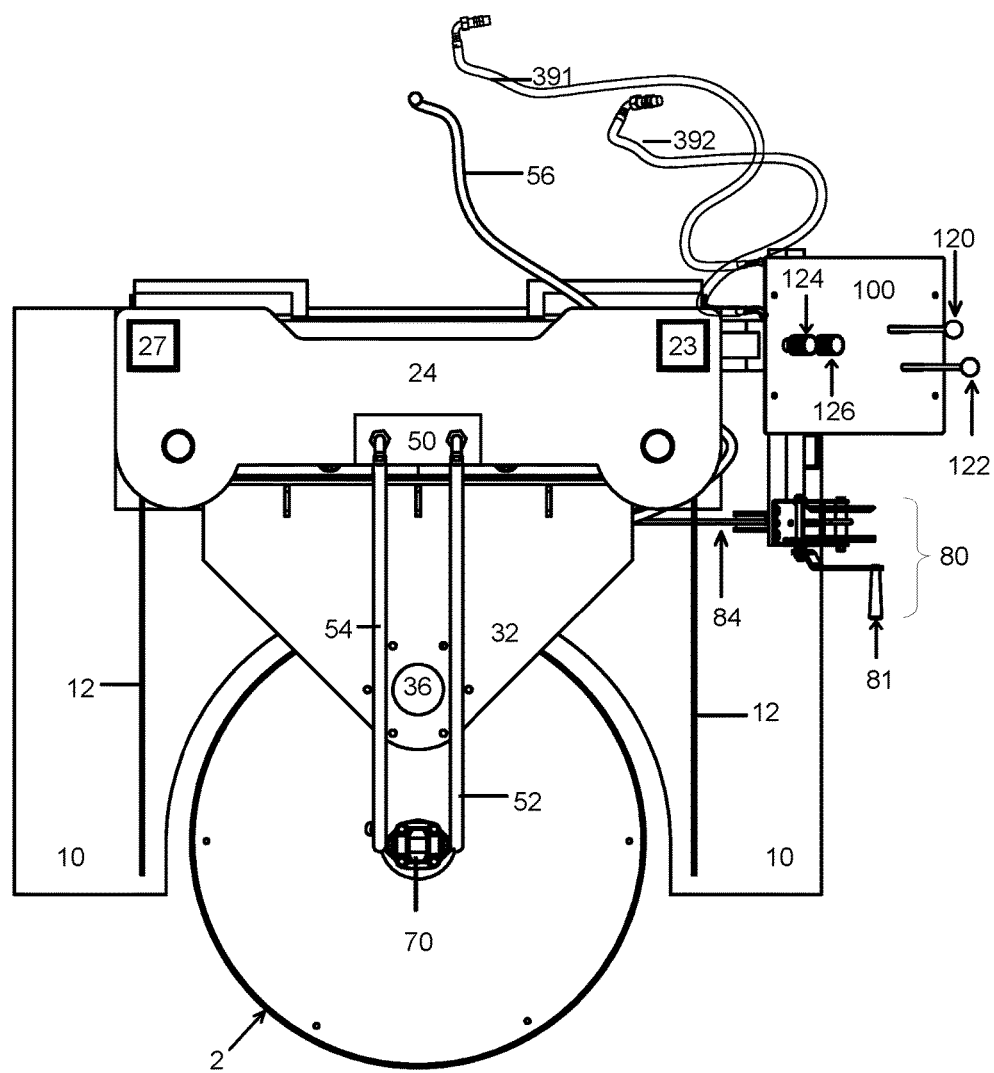
FIG. 6 depicts a top view of the two-post embodiment of the invention

A top view of the device is shown in FIG. 6. Base 10 provides a stable surface for the device to rest on the concrete slab being cored. Base 10 provides a foundation for the frame assembly. Drum saw bit 2 has sufficient space to move vertically relative to base 10. Side braces 12 provide structural integrity to the frame assembly. Carriage top plate 32 is secured into position via carriage pin 36. Motor 70 is secured onto the top of drum saw bit 2, and receives hydraulic fluid via hydraulic motor supply hose 52. Hydraulic fluid is returned to hydraulic junction box 50 via hydraulic motor return hose 54. Hydraulic junction box 50 is secured on top of frame top 24. Interior cavities 23 and 27 of frame support columns 22 and 26, respectively, are visible from the top view of the device. Winch arm 81 is moved in a circular direction relative to winch 80 to spool cable 84. Water line 56 is positioned under frame top 24 and around frame support columns 22 (not shown).

Control panel 100 includes hydraulic cylinder flow control knob 124, motor flow control knob 126, hydraulic cylinder diverter 120 and motor diverter 122. Hydraulic cylinder flow control knob 124 allows a user to release hydraulic pressure from the hydraulic cylinder returning fluid to the main reservoir of the skid steer (not shown). Motor flow control knob 126 allows a user to adjust the speed in revolutions per minute of hydraulic motor 70, which changes the speed, or revolutions per minute, of drum saw bit 2 while coring a hole in a concrete slab. Motor diverter 122 allows a user to change the direction of the flow of the hydraulic fluid through the motor thus reversing the direction of motor 70 rotation from clockwise to counterclockwise or from counterclockwise to clockwise. Hydraulic cylinder diverter 120 allows a user to send hydraulic fluid to hydraulic cylinder 94 (not shown), which drives the carriage assembly and the drum saw bit 2 upwards during operation of the device. Hydraulic junction box supply hose 391 and hydraulic junction box return hose 392 originate from the back side of control panel 100 and provide hydraulic fluid to and receive hydraulic fluid from hydraulic junction box 50, respectively.

Figure 7:
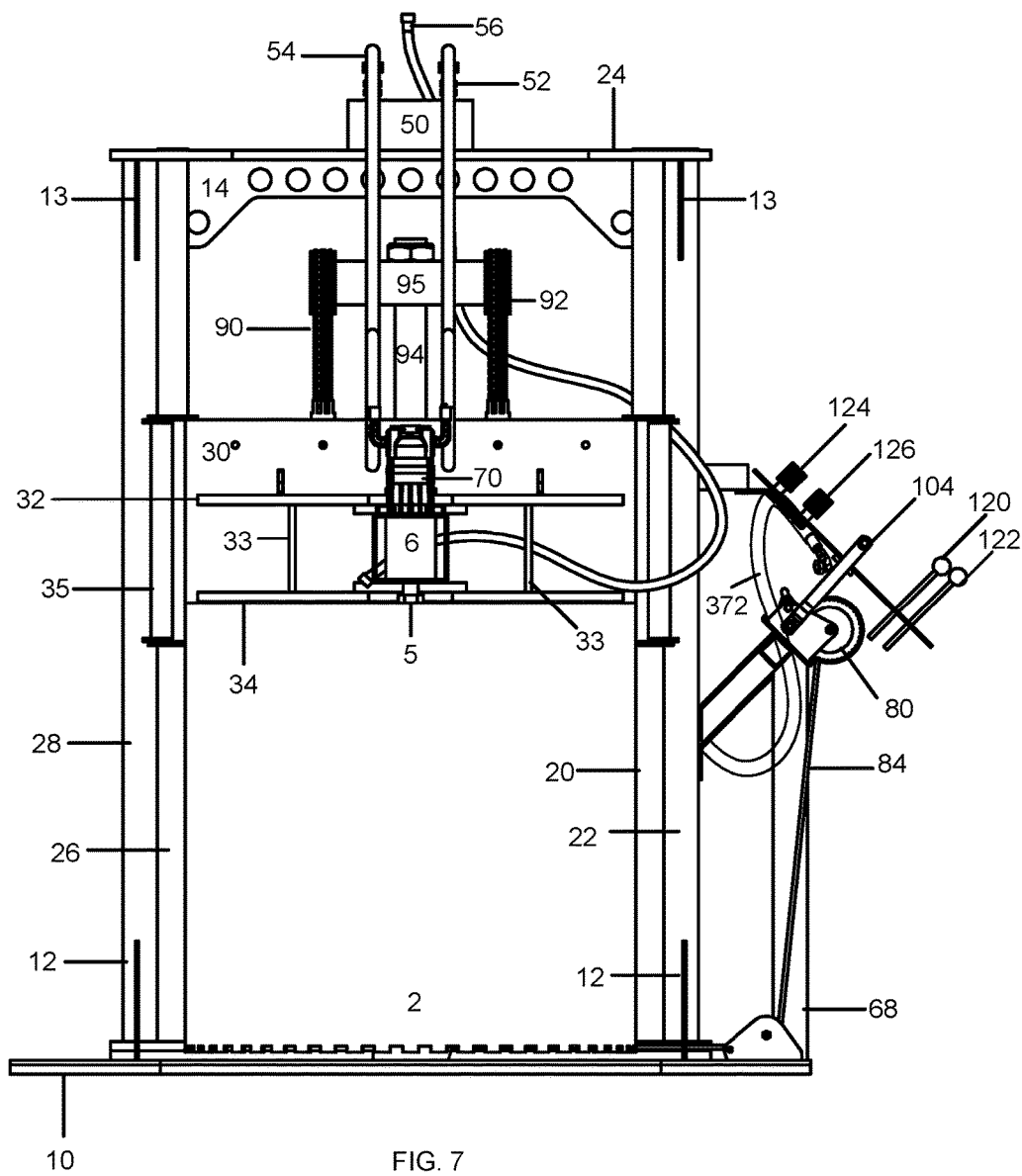
FIG. 7 illustrates a front view of the two-post embodiment.

A front view of the device is shown in FIG. 7. Druw saw bit 2 is positioned just above base 10 and is ready to operate. Drum saw threaded hub 5 anchors drum saw bit 2 onto a motor drive shaft (not shown). Pillow block 6 is positioned between carriage top plate 32 and carriage bottom plate 34 and between two vertical carriage supports 33. Motor 70 is coupled to pillow block 6 and is receiving a supply of hydraulic fluid from hydraulic junction box 50 via hydraulic motor supply hose 52. Rear brace 14 connects frame support column 22 and frame support column 26. Four side braces are shown: two side braces 12 and two top side braces 13. Two top side braces 13 are positioned at the top of the device attached to frame top 24, and two side braces 12 are positioned at the bottom of the device attached to base 10. Front carriage mounting plate 31 is depicted with the device in an "OFF" position. When the device is turned "OFF", "T" bar 95 and the upper portion of hydraulic cylinder 94, right carriage drive chain 90 and left carriage drive chain 92 are visible. Hydraulic cylinder hose 372 is shown. Hydraulic cylinder hose 372 transports hydraulic fluid to and from the hydraulic cylinder via hydraulic cylinder diverter 120 and hydraulic cylinder flow control knob 124 allowing hydraulic cylinder 94 to operate effectively.

Figure 8:
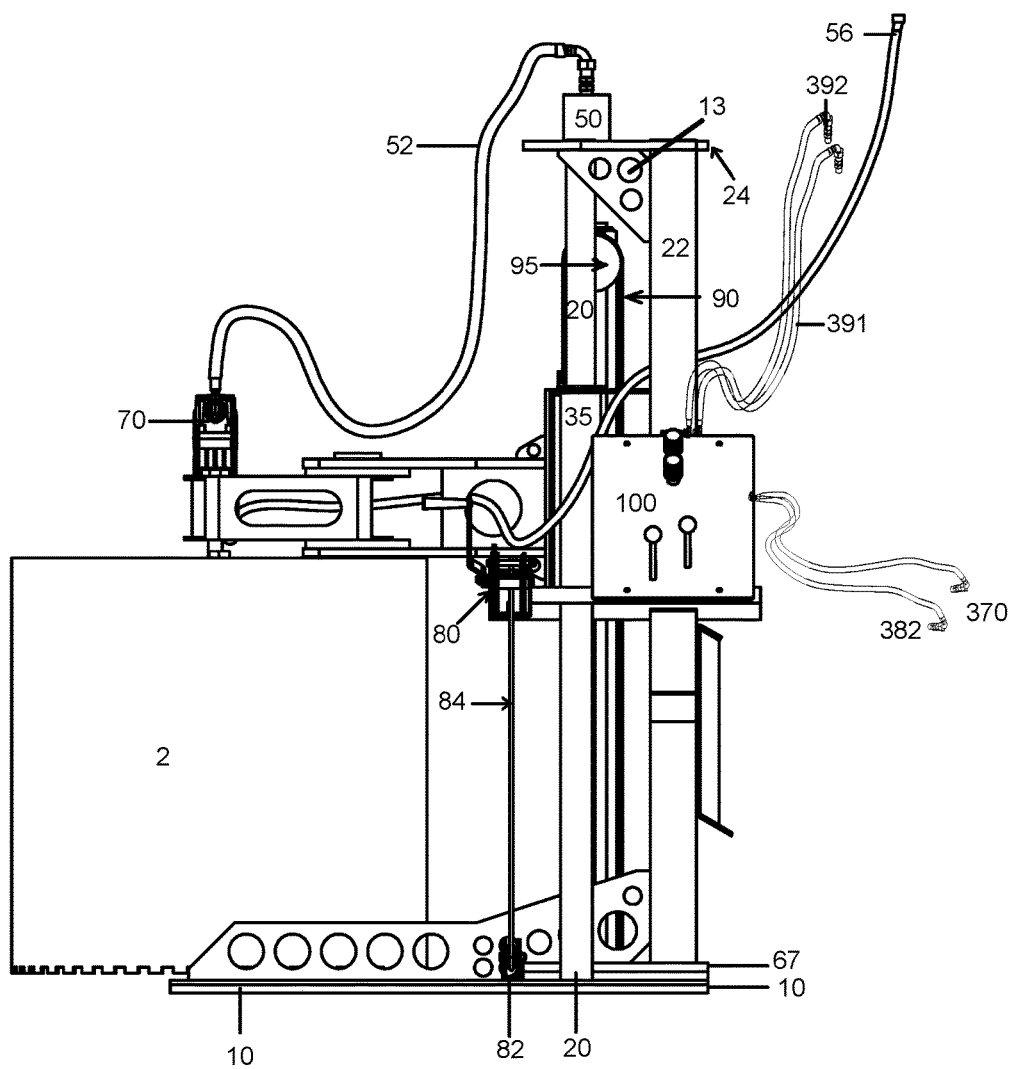
FIG. 8 depicts a side view of the two-post embodiment

A side view of the device is shown in FIG. 8. Drum saw bit 2 is positioned slightly above base 10 in the "OFF" position. Cable 84 is pulled through pulley 82 and tightly wound onto winch 80. Motor 70 is in the turned "OFF" and not working. Carriage post guide 35 is positioned on guide post 20 in the "OFF" position. Left carriage drive chain 92 is fully extended in relation to frame bottom 67. Left drive chain 92 is able to move relative to "T" bar 95 to move the carriage assembly. Top side brace 13 is attached to frame support column 22 and frame top 24. Hydraulic junction box 50 supplies motor 70 via hydraulic motor supply hose 52. Water line 56 runs from pillow block 6, were water is supplied to drum saw bit 2, through the carriage assembly, around frame support column 22, and to the skid steer (shown in FIG. 18). Hydraulic junction box supply hose 391 and return hose 392 are shown disconnected from hydraulic junction box 50. Hydraulic main supply 370, which receives hydraulic fluid from the skid steer (shown in FIG. 18), and hydraulic return hose 382, which returns hydraulic fluid to the skid steer are shown connected to the back side of control panel 100 and disconnected from the skid steer or other front loader.

Figure 9:
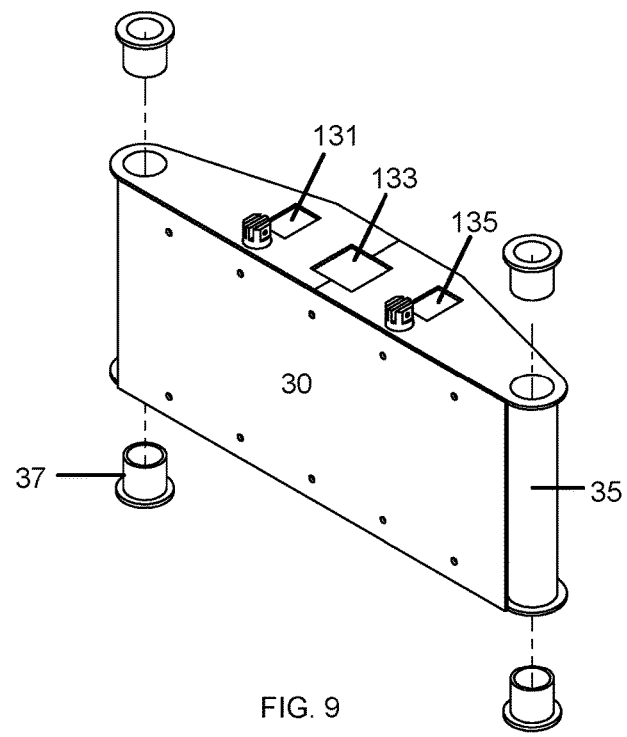
FIG. 9 depicts the carriage mounting plate.

FIG. 9 shows carriage mounting plate 30, which is the same in all three embodiments disclosed herein. Hole 131 receives right carriage drive chain 90 (shown in FIG. 7), hole 133 receives hydraulic cylinder 94 (shown in FIG. 7), and hole 135 receives left carriage drive chain 92 (shown in FIG. 7). Carriage post guide 35 receives carriage post guide bushings 37 and carriage guide posts 20 (both shown in FIG. 7). Carriage guide post bushings 37 are precision fit to slide up and down carriage guide posts 20 without vibration to insure smooth and stable travel of the carriage assembly.

Figure 10:
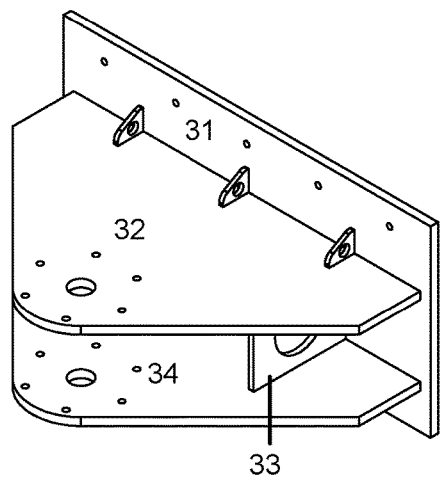
FIG. 10 illustrates the carriage motor mount assembly for the two-post embodiment.

FIG. 10 depicts the carriage motor mount support structure for the two-post embodiment. The carriage motor mount support structure will differ for the three-post and four-post embodiments. FIG. 10 shows carriage top plate 32 attached to carriage bottom plate 34 via its connection to carriage support plate 31 and carriage support 33.

Figure 11:
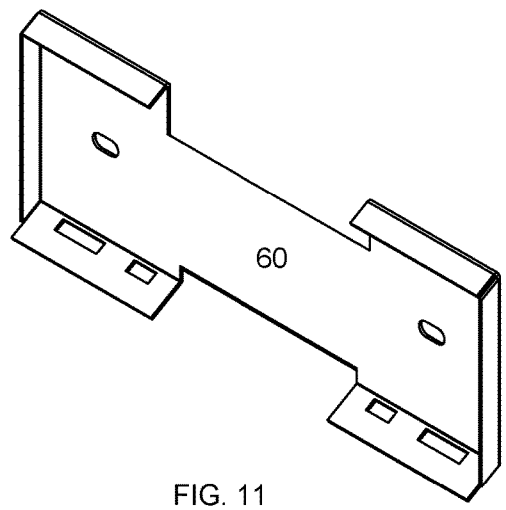
FIG. 11 illustrates the skid steer attachment plate that attaches to a front loader.
Figure 12:
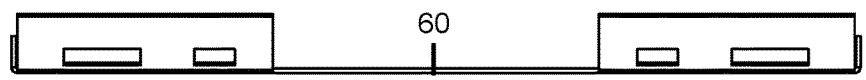
FIG. 12 depicts the top view of the skid steer attachment plate.

FIG. 11 shows a side front view of the skid steer attachment plate. This is the portion of the skid steer attachment plate 60 that actually attaches the device to a skid steer, or other front loader or heavy equipment. Skid steer attachment plate 60 may be modified so that the device can fit onto a number of different devices and a number of different models and brands of devices. FIG. 12 depicts a bottom view of skid steer attachment plate 60. Skid steer attachment plate 60 allows the device to quickly and easily be connected to and removed from a skid steer or other front loader.

Figure 13:
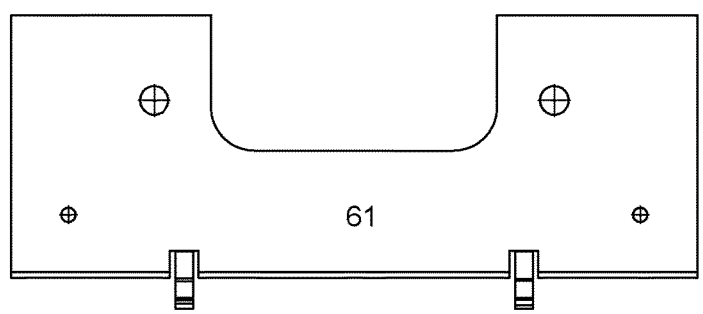
FIGS. 13, and 14 depict the front and side view of the front loader bracket, respectively.
Figure 14:
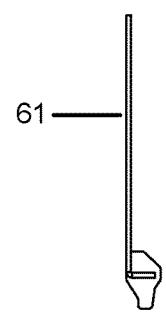

FIGS. 13 and 14 depict quick attach linkage 61 that is located on a skid steer. This device is attached onto a skid steer by linking skid steer attachment plate 60 onto quick attach linkage 61 of the skid steer or other front loader.

Figure 15:
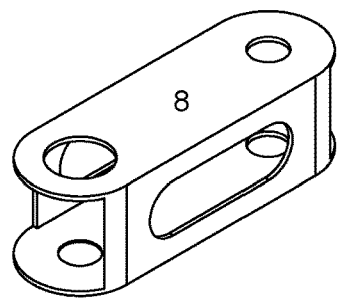
FIG. 15 illustrates the articulating motor mount that connects the drum saw to the carriage assembly.
Figure 16:
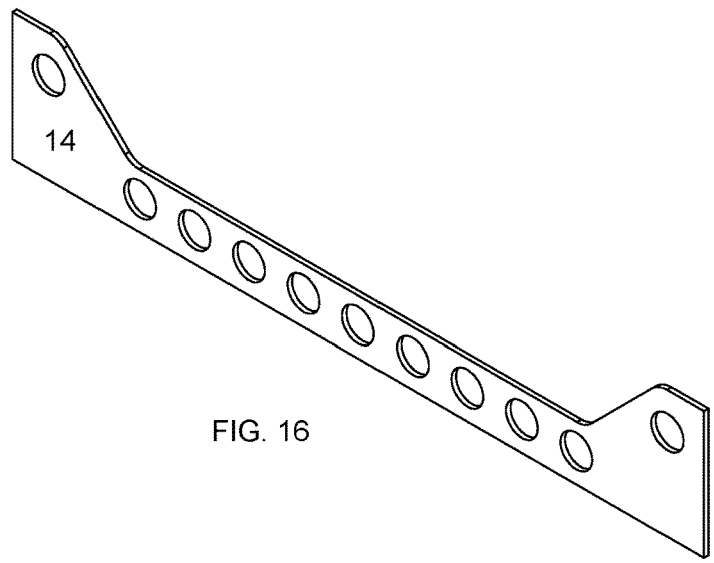
FIG. 16 illustrates the two-post embodiment carriage mounting plate.
Figure 17:
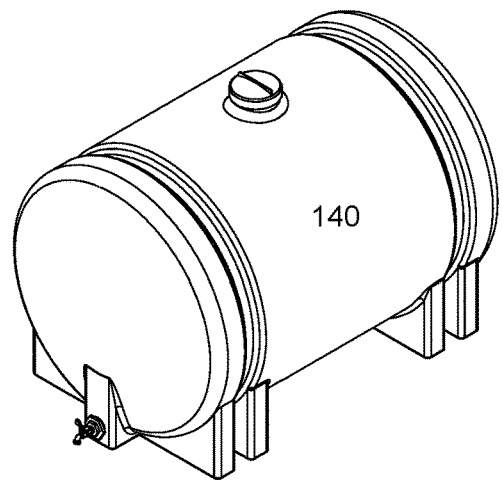
FIG. 17 depicts the water tank.

FIG. 15 illustrates articulating motor mount 8 that couples the carriage assembly to the drum saw via pillow block 6 (shown in FIG. 8). FIG. 16 depicts rear brace 14. Rear brace 14 provides structural rigidity and support to the upper and lower portions of the frame assembly. The rear braces 14 are identical in each of the three embodiments disclosed herein. FIG. 17 depicts water tank 140 that may be used to provide water to drum saw bit 2 during operation/coring of a hole. Water tank 140 may be attached in any convenient location along the skid steer or the device itself. Water tank 140 should be large enough to hold sufficient water to core multiple holes prior to refilling.

Figure 18:
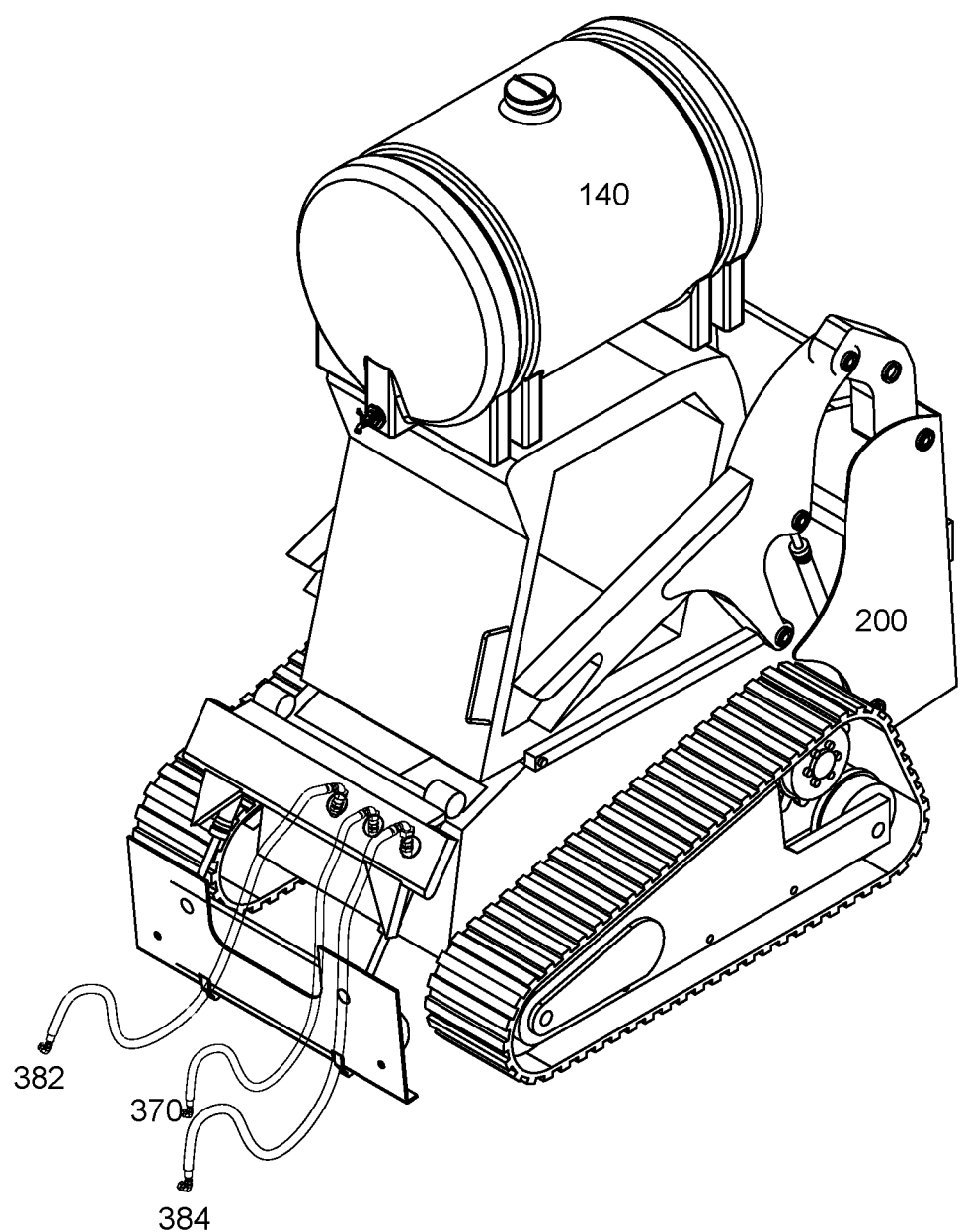
FIG. 18 depicts a skid steer front loader with the water tank installed.

FIG. 18 illustrates skid steer 200 with the following hoses attached: hydraulic main supply hose 370, hydraulic return hose 382, and hydraulic auxiliary return hose 384. Skid steer 200 may attach the hydraulic supply hoses/lines in any compatible conformation. Skid steer 200, as pictured in FIG. 18, is ready to receive the device herein.

Figure 19:
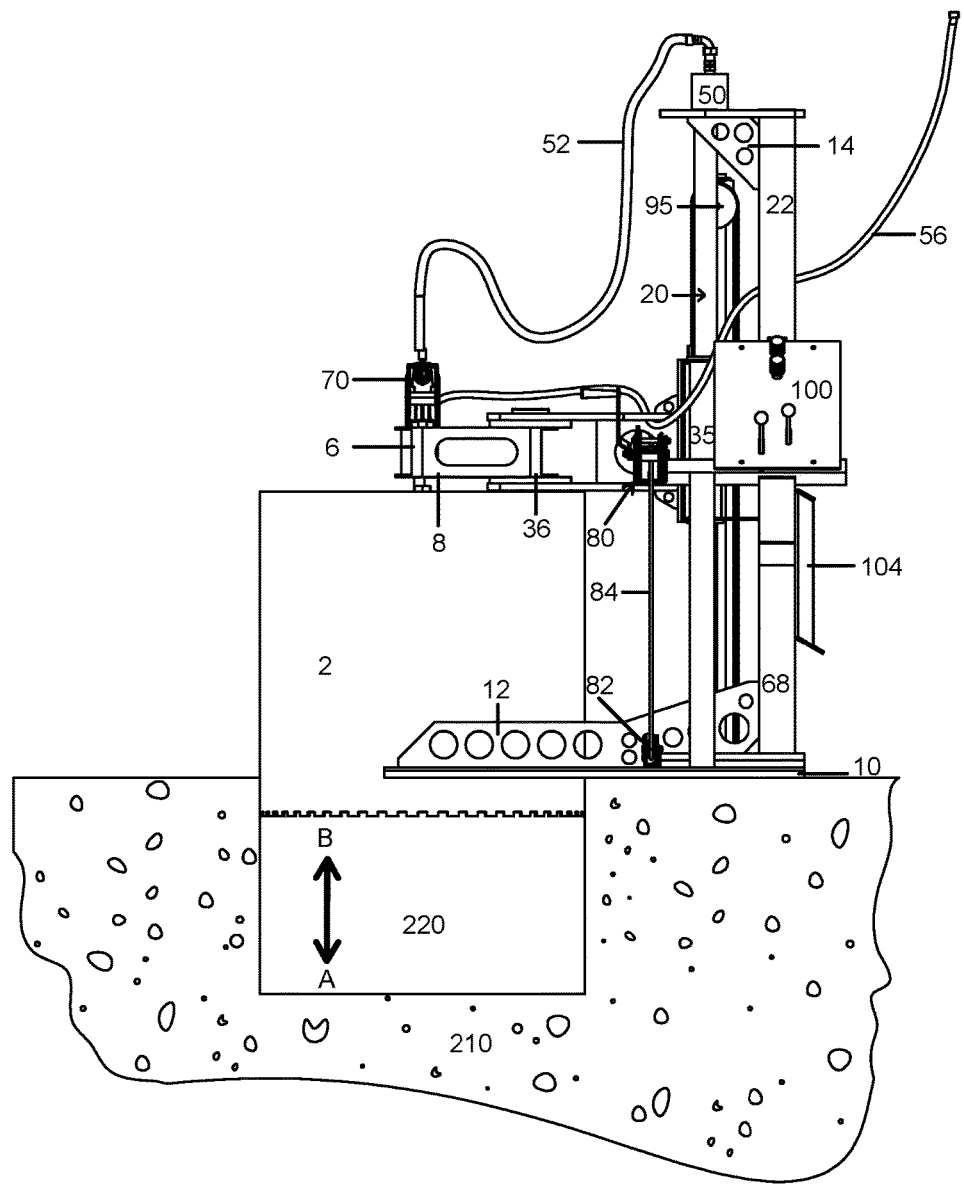
FIG. 19 illustrates the two-post embodiment coring a slab of concrete.

FIG. 19 depicts the two-post embodiment coring a hole in a concrete slab 210. Drum saw bit 2 has moved in the "A" direction, producing hole 220 in concrete slab 210. The saw tooth edge of drum saw bit 2 is positioned below side brace 12, and base 10. Cable 84 has been tightened through pulley 82 causing the carriage assembly and motor 70 to move in the "A" direction. As the carriage assembly moves in the "A" direction, carriage post guide 35 moves down the length of carriage guide post 20 towards base 10. The weight of the drum saw allows it to float in the "A" direction. Winch 80, when spooled, drives drum saw bit 2 in the "A" direction at a faster rate. The drum saw moves in the "B" direction with a user manipulating the controls on control panel 100 causes the hydraulic cylinder (shown in FIG. 7) to lift the carriage assembly via the right and left carriage drive chains (90 and 92, respectively).

FIG. 20 depicts the two-post embodiment of concrete core drill attachment 1 reversibly connected to skid steer 200, with mounted water tank 140. The winch and control panel are at all times within the reach and manipulation of the operator, making operation of the device easy and safe, which saves time and money.

FIG. 21 depicts the three-post embodiment 300 of the Heavy Equipment Concrete Core Drill Attachment. The three-post embodiment 300 comprises a frame assembly with three frame support columns-two in the rear of the frame assembly near the point of attachment of the device onto a skid steer, a carriage assembly that moves relative to the three-post frame assembly, and a drum saw attached to the carriage assembly that cores a hole in a concrete slab.

The three-post embodiment illustrated in FIG. 21 includes: base 310, front frame bottom 311, front side brace 313, front brace 315, top front brace 316, middle guide post 320, two middle top brackets 325, middle center bracket 326, middle frame post 328, rear top bracket 347, frame support column 22, and right and left guide posts 20. The two middle top brackets 325, middle center bracket 326, and rear top bracket 347 form a triangular brace that adds additional stability to the frame assembly. Two side braces 312 add structural support to the frame assembly. The numerous braces and brackets form a stable and strong frame assembly that is well suited to secure the drum saw and the necessary components. All components of the frame assembly may be composed of steel, stainless steel, aluminum, composites and alloys that provide strength and durability to the device.

The triangular brace system of the three-post embodiment 300 transfers vibration and kickback from the drum saw and distributes it to both the front and rear frame assembly. Because of this distribution of vibration and kickback, there is less wear on the drum saw extending the life of the drum saw. Additionally, the reduction in vibration and kickback reduces the frequency of the bit binding allowing the drum saw to cut more efficiently and produces cleaner cuts. The three-post embodiment is heavier and adds additional support for the carriage resulting in more stability than the two-post embodiment.

The pulley system includes winch 80, a number of pulleys 82, cable 84, and cable junction plate 182. The pulley systems allows a user to crank on winch 80 to spool cable 84, causing the cable to tighten through pulleys 82, driving drum saw bit 2 in a downward direction to core a hole. Note that pulleys 82 and cable 84 are secured and strung in multiple locations along base 310, middle top brackets 325, and any other advantageous areas of the frame assembly.

An exploded view of the three-post embodiment is shown in FIG. 22. Drum saw bit 2 with attached pillow block 6 are detached. Motor 70, winch 80, skid steer attachment plate 60, and hydraulic junction box 50 with attached hydraulic motor supply hose 52 and hydraulic motor return hose 54 are all detached from the device. Control panel 100 is detached from frame post 68. The following hoses are attached to the control panel, but detached at the other end: hydraulic main supply hose 370, hydraulic cylinder hose 372, hydraulic return hose 382, hydraulic auxiliary return hose 384, hydraulic junction box supply hose 391, and hydraulic junction box return hose 392. Water line 56 is detached from pillow block 6.

The carriage assembly is depicted in the "OFF" position with carriage mounting plate 30 at its closest point to rear top bracket 347. Water line 56 is positioned between carriage top plate 332 and carriage bottom plate 334.

A top view of the three-post embodiment is illustrated in FIG. 23. Both side braces 312 and front side braces 313 are shown attached to base 310. Front brace 315 is attached to front frame bottom 311. The triangular brace system comprising rear top bracket 347, two middle top brackets 325, and middle center bracket 326 add support to drum saw bit 2. Cavities 21, 23, 25, 27, 319, and 329 are hollow openings in the steel supports that may or may not be present, depending on the fabrication of the frame assembly. Skid steer attachment plate 60 allows the three-post embodiment to be reversibly coupled to a skid steer. Motor 70, which is connected to hydraulic junction box 50 via hydraulic motor supply hose 52 and hydraulic motor return hose 54.

A user cranks winch crank 81 to spool cable 84, attached to cable junction plate 182, to lower drum saw bit 2 into a slab of cement. Importantly, control panel 100 and winch crank 81 are positioned next to each other so that a user has control of all functions of the device within an arm's reach. This allows a single user to operate the device and allows a user to quickly and easily manipulate all functions of the device.

FIG. 24 illustrates a front view of the three-post embodiment in the "OFF" position. Middle frame support column 328 is secured onto front frame bottom 311 and base 310. Front braces 315 secure middle frame post 328 to front frame bottom 311. Two front side braces 313 secures base 310 to frame support column 22 and 26 via side brace 312 (not shown). Two top front braces 316 secure the top of middle frame post 328 to middle center bracket 326. Front carriage mounting plate 31 and middle carriage post guide 335 secure carriage top and carriage bottom plates 332 and 334. Cable 84 threads a number of pulleys 82 and cable junction plate 182. Right and left carriage drive chains, 90 and 92, are secured onto "T" bar 95 in the "OFF" position.

FIG. 25 illustrates a side view of the three-post embodiment in the "OFF" position. Side brace 312, front side brace 313, front brace 315, and top front brace 316 add structural integrity to the frame assembly. Drum saw bit 2 is positioned above base 310 in an "OFF" position. A number of pulleys 82 are positioned throughout the frame assembly. Cable 84 is threaded through pulleys 82, cable junction plate 182, and threaded onto winch 80. A user has ready access to control panel 100 while cranking winch crank 81. The side top bracket 325 extends from frame support column 22 to middle frame support column 328. Carriage top plate 332 and carriage bottom plate 334 are attached to carriage post guide 35 and carriage middle post guide 335. Carriage post guide 35 and carriage middle post guide 335 move up and down guide post 20 and middle guide post 320, respectively, to lower drum saw bit 2 to core a hole.

FIGS. 26, 27, and 28 illustrate portions of the carriage assembly for the three-post embodiment. FIG. 26 is an exploded view of the carriage assembly. Rear carriage mounting plate 30 includes holes 131, 133, and 135 that receive the right carriage drive chain, hydraulic cylinder, and left carriage drive chain (90, 94, and 92, respective, shown in FIG. 7). The carriage motor mount comprises carriage top plate 332, carriage bottom plate 334, carriage support 33. The carriage top and carriage bottom plates (332 and 334) are attached to front carriage mounting plate 31 and middle carriage mounting plate 339, which attaches to post guide 335. Carriage post guide 335, as depicted in FIG. 27, allows the carriage assembly to move up and down middle carriage guide post 320. Bushings 37 are precision fit to slide up and down middle carriage guide post 320 without vibration to insure smooth and stable travel of the carriage assembly. FIG. 28 illustrates the rear carriage mounting plate 30, which is the same in all three embodiments of the device.

FIG. 29 depicts the three-post embodiment while coring a hole in a concrete slab 210. Drum saw bit 2 moves in the "A" direction upon a user cranking winch crank 81 so that cable 84 is spooled onto winch 80 tightening cable 84 as it moves through the multiple pulleys 82 and cable junction plate 182. Drum saw bit 2 moves in the "B" direction raising hydraulic cylinder 94 causing the carriage assembly (carriage top plate 332, carriage bottom plate 334, middle carriage post guide 335, and carriage post guide 35) to move upward (away from base 310) along the length of middle carriage guide post 20. Hydraulic cylinder 94 moves the carriage assembly via movement of the left and right carriage drive chains 90 and 92 over "T" bar 95. Hydraulic cylinder hose 372 is depicted running from the back of control panel 100 and through side brace 312 to the base of hydraulic cylinder 94. Hydraulic junction box supply hose 391 and hydraulic junction box return hose 392 run from the back of control panel 100 and up to junction box 50.

FIG. 30 depicts rear brace 14, which is the same in all three embodiments. FIG. 31 depicts side brace 312 and front side brace 313 that add structural support and strength to the device. The number and location of braces may be changed so to maximize the stability of the device.

FIGS. 32 and 33 depict the top view of frame bottom 67 and frame top 24, respectively. All three embodiments disclosed herein utilized the same frame bottom 67. Frame bottom 67 may include interior cavities 23 and 27 that are utilized to attach hollow frame support columns 22 and 26 to frame bottom 67. All three embodiments herein utilize the same frame top 24. Frame top 24 is not visible in the FIGS. illustrating the three-post embodiment because it is positioned beneath rear top bracket 347. Frame top 24 may include interior cavities 23 and 27 that are utilized to attach hollow frame support columns 22 and 26 to frame top 24.

FIGS. 34 and 35 illustrate front frame bottom 311 and middle top bracket 326. Both may include cavities 341 and 343 that anchor middle carriage guide post 320 and middle support column 328, respectively.

FIGS. 36 and 37 depict top views of rear top bracket 347, and FIG. 38 depicts the triangular bracket comprising: rear top bracket 347 coupled to two side top brackets 325 and middle top bracket 326. Cavities 23 and 27 receive frame support columns 22 and 26, while cavities 341 and 343 receive middle frame support column 328 and middle carriage guide post 320, respectively. This triangular bracket provides stability to the drum saw preventing binding of the saw, which reduces the time spent on coring the concrete and produces a smooth hole in said concrete.

Base 310 of the three-post embodiment is depicted in FIG. 39. Drum saw hole 399 is the hole through which drum saw bit 2 moves while coring a hole. Cavity 341, which receives middle frame support column 328. The length and width of base 310 provides great stability to the device and prevents movement of drum saw bit 2 during operation.

FIG. 40 illustrates an angled front view of control panel 100, while FIG. 41 depicts a front view. Knobs 120 and 122 are diverters. Diverter 120 may be moved up and down within channel 123 to manipulate the amount of hydraulic fluid sent to hydraulic cylinder 94, which drives the carriage assembly and drum saw bit 2 upwards. The movement of diverter 122 within channel 125 changes the direction of the flow of hydraulic fluid through motor 70 changing direction of the motor rotation within (clockwise vs. counterclockwise rotation of motor 70). Knob 124 is the hydraulic cylinder flow control knob. Turning knob 124 releases hydraulic pressure from hydraulic cylinder 94, returning fluid to the main reservoir of the skid steer via hydraulic auxiliary return hose 384 (shown in FIG. 18). This lowers drum saw bit 2 to allow it to cut deeper into concrete slab 210. Knob 126 adjust the speed in revolutions per minute of motor 70, which increases or decreases the speed in revolutions per minute of drum saw bit 2.

FIG. 42 illustrates the configuration of the hydraulic system on the control panel backside 388 of control panel 100. Diverters 122 and 120 are contained within hydraulic manifold 381. Hydraulic main supply hose 370 brings hydraulic fluid into hydraulic manifold 381 from the attached skid steer (shown in FIG. 18). Diverter 122 diverts some of the hydraulic fluid bidirectionally via hydraulic cylinder hose 372 to hydraulic cylinder 94 and to hydraulic cylinder flow control knob 124. Flow control knob 124 must be closed to raise the cylinder within hydraulic cylinder 94. Excess hydraulic fluid may be sent via hydraulic auxiliary return hose 384 to the skid steer reservoir. Hydraulic fluid is sent from hydraulic manifold 381 via diverter 122 to motor flow control knob 126 via hose 396. Motor flow control knob 126 routes fluid to motor 70 via hydraulic junction box supply hose 391 and hydraulic motor supply hose 52. Motor 70 returns hydraulic fluid to diverter 120 via hydraulic motor return hose 54 and hydraulic junction box return hose 392. Fluid is also sent from diverter 120 to the skid steer via hydraulic return hose 382 (shown in FIG. 18).

The four-post embodiment 401 is pictured in FIGS. 43 through 55. The four-post version features a frame assembly comprising a pair of frame posts positioned opposite a second pair of frame posts with a drum saw positioned between the two pairs of frame posts. The four-posts embodiment 401 is the largest, heaviest, and most stable of the embodiments disclosed herein. FIG. 43 discloses a side view of the four-post embodiment.

Each of the two side braces 412 attach base 410 to frame bottom 67, front frame bottom 311, and two frame support column 22 or 26. The top and bottom of the front and back of the frame assembly is secured by four rear braces 14. The rectangular bracket 425 is rectangular in shape with each corner supported by a single frame support column 22 or 26 and reinforced by two side braces 412 and two rear braces 14 The rear of the device is defined as the side of the device wherein skid steer attachment plate 60 is attached to the frame assembly. There are two carriage guide posts 20 positioned at the front of the device, and two positioned at the rear of the device. There are two carriage assemblies comprised of a carriage mounting plate 30 and two carriage post guides 35 coupled to a motor mount assembly. Motor mount top plate 432 is positioned above motor mount bottom plate 434. Each carriage mounting plate 30 is coupled to an individual drive system consisting of a right and left carriage drive chain, 90 and 92, and hydraulic cylinder 94, and "T" bar 95. Each carriage mounting plate 30 moves vertically up and down the carriage guide posts 20 to move the carriage assembly, and hence, drum saw bit 2 up and down while coring a hole. A cable 84 is threaded through a number of pulleys 82 and cable junction plate 182. Water line 56 provides water to drum saw bit 2 during use. Hydraulic motor supply hose 52 and hydraulic motor return hose 54 service motor 70 via hydraulic junction box 50. A single hydraulic cylinder hose 372 (not shown) may service both hydraulic cylinders 94 or a separate hydraulic cylinder hose 372 may be run to each hydraulic cylinder 94. If a second hydraulic cylinder hose 372 is employed, both of them may be controlled via diverter 124. The addition of a second hydraulic cylinder 94 assists in raising and lowering the carriage assembly.

An exploded view of the device is pictured in FIG. 44. Drum saw bit 2 and pillow block 6 are detached from the carriage assembly. Motor 70 and hydraulic lines, skid steer attachment plate 60, and winch 80 are detached. Control panel 100 is shown with the following detached hoses/lines: hydraulic main supply hose 370, hydraulic cylinder hose 372, the second hydraulic cylinder hose 372B that supplies the second hydraulic cylinder 94, hydraulic return hose 382, hydraulic auxiliary return hose 384, hydraulic junction box supply hose 391, and hydraulic junction box return hose 392. A cable is threaded through a number of pulleys 82 and cable junction plate 182. Base 410 includes drill saw hole 399 that is sized to allow drum saw bit 2 to move through it to core a hole in concrete or asphalt. The frame assembly is anchored onto frame bottom 67 and front frame bottom 311, which anchors the frame posts to base 410.

FIG. 45 shows skid steer 200 (with water tank 140 attached to its roof) ready to attach the four-post embodiment 401. FIG. 46 shows a top view of the device. Rectangular bracket 425 includes interior cavities 23 and 27 that represent the interior of hollow frame support column 22 and frame support column 26, respectively. Drum saw bit 2 is positioned beneath motor mount top and bottom plates 432 and 434 (434 is shown in FIG. 43). Motor 70 powers drum saw bit 2 as it cores a hole. Motor 70 is supplied by hydraulic motor supply hose 52 and fluid is returned to the hydraulic system via hydraulic motor return hose 54 via hydraulic junction box 50. Pulleys 82 attached to the underside of rectangular bracket 425. Winch 80 with winch crank 81 are located proximate to control panel 100 so that a single user has ready access to all controls while operating the device.

FIG. 47 shows a side view of the device with four frame support columns. Winch 80 and control panel 100 are positioned proximate to each other to facilitate user manipulation. Drum saw bit 2 is shown above base 410 in the "OFF" position. Motor 70 is coupled to drum saw bit 2. Motor mount top plate 432 is attached to motor mount bottom plate 434 via motor mount support 433. The carriage assembly moves vertically up and down carriage guide posts 20 via carriage post guide 35. Two frame column supports 22 connect rectangular bracket 425 to frame bottom 67 and front frame bottom 311, which are both attached to base 410. Side braces 412 run the length of base 410 and rectangular bracket 425 from frame column supports 22 to the second frame column supports 22. There are two "T" bars 95 wherein each "T" bar 95 is coupled to a single left and right carriage drive chain 92 and 90, respectively (right carriage drive chain 90 is shown in FIG. 43). Cable 84 is threaded through multiple pulleys 82 and cable junction plate 182.

The four-post carriage assembly is depicted in FIG. 48. Carriage mounting plate 30 includes holes 131, 133, and 135 that provide sufficient space to accommodate the right carriage drive chain 90 (hole 131), hydraulic cylinder 94 (hole 133), and left carriage drive chain 92 (hole 135). There is a carriage mounting plate 30 on each end of the carriage assembly. Motor mount top plate 432 is positioned above motor mount bottom plate 434 and connected thereto via motor mount support 433. Each end of the motor mount attaches to motor mount plate 439. Each motor mount plate 439 attaches to a carriage mounting plate 30.

FIG. 49 depicts a side view of the device in the "ON" position wherein drum saw bit 2 of the four-post device coring hole 220 into concrete slab 210. Drum saw bit 2 is below base 410 and into the matrix of concrete slab 210 moving in the "A" direction. After coring the hole, drum saw bit 2 moves in the "B" direction to withdraw drum saw bit 2 from concrete slab 220. Compared to FIG. 47, the carriage assembly has moved vertically along carriage guide post 20 via carriage post guide 35 towards base 410. Frame support columns 22 support the height of the device. Two "T" bars 95 are positioned at opposite ends of the device so that each is paired to a right and left carriage drive chain 90 and 92, respectively (right carriage drive chain 90 is shown in FIG. 43). Winch 80 is positioned next to control panel 100 to make it easier for a user to operate the device. Frame post 68 supports control panel arm 104, which supports control panel 100 so that control panel may be easily accessed by a user. Cable 84 threads through multiple pulleys 82 and cable junction plate 182. In the "ON" position cable 84 is spooled onto winch 80 more so than when the device is in the "OFF" position.

Rear braces 14 utilized in the four-post embodiment are depicted in FIG. 50. FIG. 51 depicts top side brace 412 while FIG. 52 shows bottom side brace 412. FIG. 53 shows square bracket 425. Base 410 is shown in FIG. 54. Base 410 includes drill saw hole 399 that allows drum saw bit 2 (shown in FIG. 49) to move below base 410 to core a hole. FIG. 55 shows the four-post embodiment 401 attached to skid steer 200 that is ready to work to core holes.

I hereby claim:

1. A hole coring machine that reversibly mounts to a skid steer comprising:
   a frame assembly that reversibly mounts to a skid steer, wherein the frame assembly comprises:
   a mounting member that reversibly mounts to the skid steer;
   two or more frame supporting members that connect a base member to a top member; wherein the base member includes an opening that allows a drum saw to move vertically within said opening while said drum saw is coring a hole; and
   at least one carriage supporting member that connects the base member to the top member, wherein the at least one carriage supporting member supports a carriage assembly,
   the carriage assembly that mounts to the frame assembly, wherein the carriage assembly comprises:
   a carriage mounting member that mounts the carriage assembly onto the at least one carriage supporting member of the frame assembly; wherein the carriage assembly moves vertically relative to the at least one carriage supporting member when the hole coring machine cores a hole,
a hydraulic cylinder that moves the carriage assembly relative to the at least one frame supporting member; and
a drum saw mounting member that mounts the drum saw onto the carriage assembly,
the drum saw mounted to the carriage assembly, wherein the drum saw is adapted to core a hole in concrete, and
the mounting member that allows the hole coring machine to reversibly couple to a hydraulic system of the skid steer, wherein the hydraulic cylinder uses the hydraulic system of the skid steer while coring a hole.

2. The device of claim 1 wherein the skid steer is a front loader.

3. The device of claim 1, further comprising a motor that powers the drum saw, wherein the motor is powered by the hydraulic system of the skid steer.

4. The device of claim 1, further comprising a cable system that includes a cable, a winch, and at least one pulley, wherein the cable system allows a user of the hole coring machine to lower the drum saw relative to the base member.

5. The device of claim 1, further comprising a drive train that includes at least one drive chain.

6. The device of claim 1 wherein the carriage mounting member includes at least one bushing, wherein the bushing makes contact with the at least one carriage supporting member of the frame assembly.

7. The device of claim 1 wherein the frame assembly includes two frame supporting members.

8. A hole coring machine that reversibly mounts to a skid steer comprising:
a frame assembly that reversibly mounts to the skid steer, wherein the frame assembly comprises:
a mounting member that reversibly mounts to the skid steer;
three frame supporting members that connect a base member to a top member; wherein the base member includes an opening that allows a drum saw to move vertically within said opening while said drum saw is coring a hole; and
three carriage supporting members that connect the base member to a top member, wherein the three carriage supporting members support a carriage assembly,
the carriage assembly that mounts to the frame assembly, wherein the carriage assembly comprises:
a member that mounts the carriage assembly onto the three carriage supporting members of the frame assembly; wherein the carriage assembly moves vertically relative to the three carriage supporting members of the frame assembly when the hole coring machine cores a hole,
a hydraulic cylinder that moves the carriage assembly relative to the three carriage supporting members; and
a drum saw mounting member that mounts the drum saw onto the carriage assembly,
the drum saw mounted to a carriage assembly, wherein the drum saw is adapted to core a hole in concrete, and
the mounting member that allows the hole coring machine to reversibly couple to a hydraulic system of the skid steer, wherein the hydraulic cylinder uses the hydraulic system of the skid steer while coring a hole.

9. The device of claim 8 wherein two carriage supporting members are positioned adjacent to the mounting member and the third carriage supporting member is positioned opposite the two carriage supporting members wherein the drum saw is positioned between the two carriage supporting members and the third carriage supporting member.

10. The device of claim 8 wherein the skid steer is a front loader.

11. The device of claim 8, further comprising a motor that powers the drum saw, wherein the motor is powered by the hydraulic system of the skid steer.

12. The device of claim 8, further comprising a cable system that includes a cable, a winch, and at least one pulley, wherein the cable system allows a user of the hole coring machine to lower the drum saw relative to the base member.

13. The device of claim 8, further comprising a drive train that includes at least one drive chain.

14. The device of claim 8 wherein the carriage mounting member includes three or more bushings, wherein a bushing makes contact with each of the three carriage supporting members of the frame assembly.

15. A hole coring machine that reversibly mounts to a skid steer comprising:
a frame assembly that reversibly mounts to the skid steer, wherein the frame assembly comprises:
a mounting member that reversibly mounts to a skid steer;
four frame supporting members that connect a base member to a top member; wherein the base member includes an opening that allows a drum saw to move vertically within said opening while said drum saw is coring a hole; and
four carriage supporting members that connect the base member to a top member, wherein the four carriage supporting members support a carriage assembly,
the carriage assembly that mounts to the frame assembly, wherein the carriage assembly comprises:
a member that mounts the carriage assembly onto the four carriage supporting members of the frame assembly; wherein the carriage assembly moves vertically relative to the four carriage supporting members of the frame assembly when the hole coring machine cores a hole,
a hydraulic cylinder that moves the carriage assembly relative to the four carriage supporting members; and
a drum saw mounting member that mounts the drum saw onto the carriage assembly,
the drum saw mounted to the carriage assembly, wherein the drum saw is adapted to core a hole in concrete, wherein the hole is cored in front of the skid steer and not lateral to the skid steer; and
the mounting member that allows the hole coring machine to reversibly couple to a hydraulic system of the skid steer, wherein the hydraulic cylinder uses the hydraulic system of the skid steer while coring a hole.

16. The device of claim 15 wherein the skid steer is a front loader.

17. The device of claim 15, further comprising a motor that powers the drum saw, wherein the motor is powered by the hydraulic system of the skid steer.

18. The device of claim 15, further comprising a cable system that includes a cable, a winch, and at least one pulley, wherein the cable system allows a user of the hole coring machine to lower the drum saw relative to the base member.

19. The device of claim 15, further comprising two drive trains, wherein one drive train is positioned adjacent the mounting member and one drive train is positioned opposite the drive train positioned adjacent to the mounting member.

20. The device of claim 15 wherein the carriage mounting member includes four or more bushings, wherein a bushing makes contact with each of the four carriage supporting members of the frame assembly.

* * * * *